Figure 1:
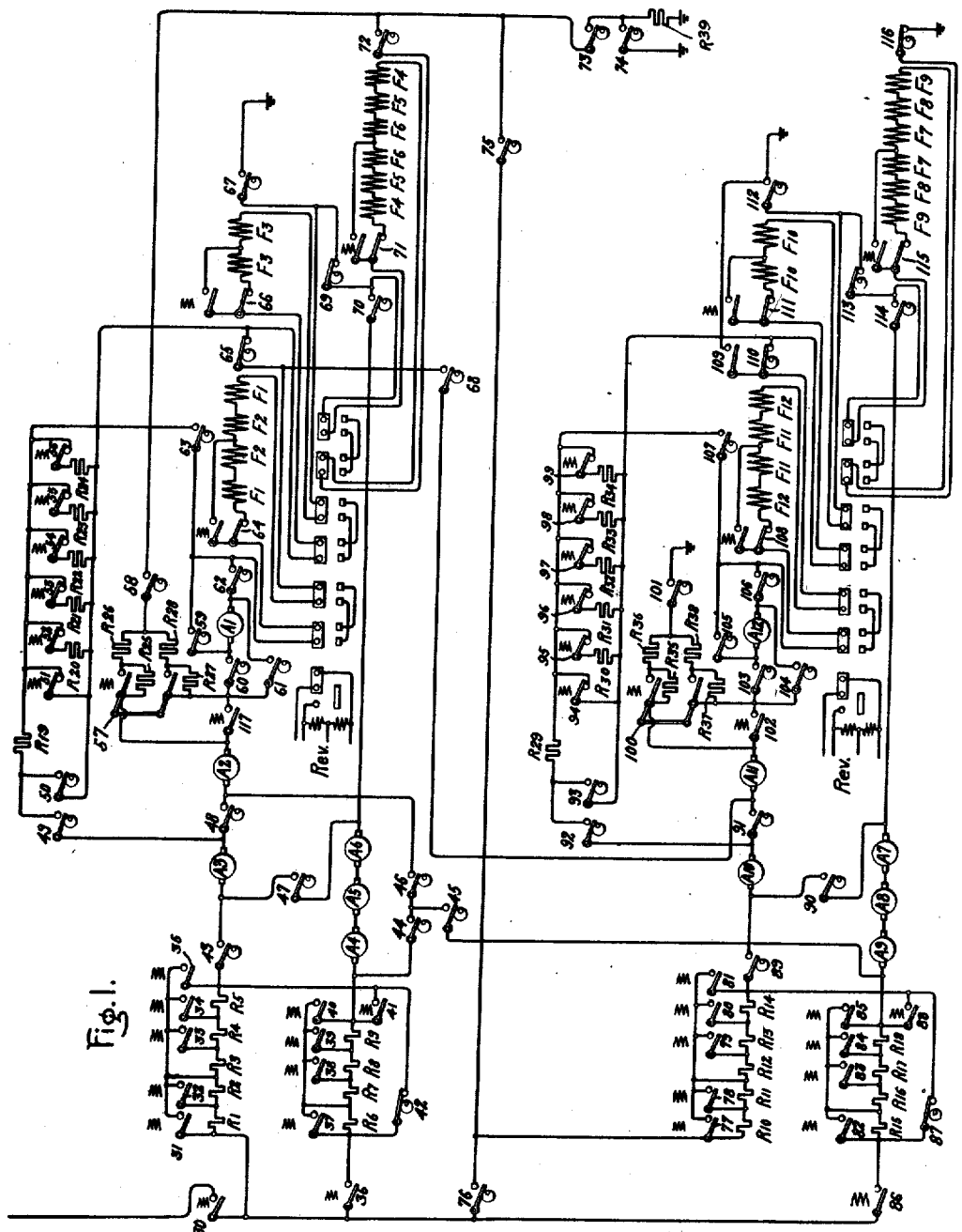

Oct. 23, 1923.　　　　　　　　　　　　　　　　　　　1,471,893
W. S. H. HAMILTON ET AL
SYSTEM AND APPARATUS FOR POWER TRANSMISSION AND REGENERATIVE BRAKING
Filed Oct. 15, 1921　　16 Sheets-Sheet 1

Inventors:
Rudolph D. Krape,
William S. H. Hamilton,
by Albert G. Davis
Their Attorney.

Oct. 23, 1923.

W. S. H. HAMILTON ET AL 1,471,893

SYSTEM AND APPARATUS FOR POWER TRANSMISSION AND REGENERATIVE BRAKING

Filed Oct. 15, 1921  16 Sheets—Sheet 4

Fig.4.

Inventors:
Rudolph D. Krape,
William S. H. Hamilton,
by Albert G. Davis
Their Attorney.

Inventors:
Rudolph D. Krape,
William S. H. Hamilton,
by *Albert E. Davis*
Their Attorney.

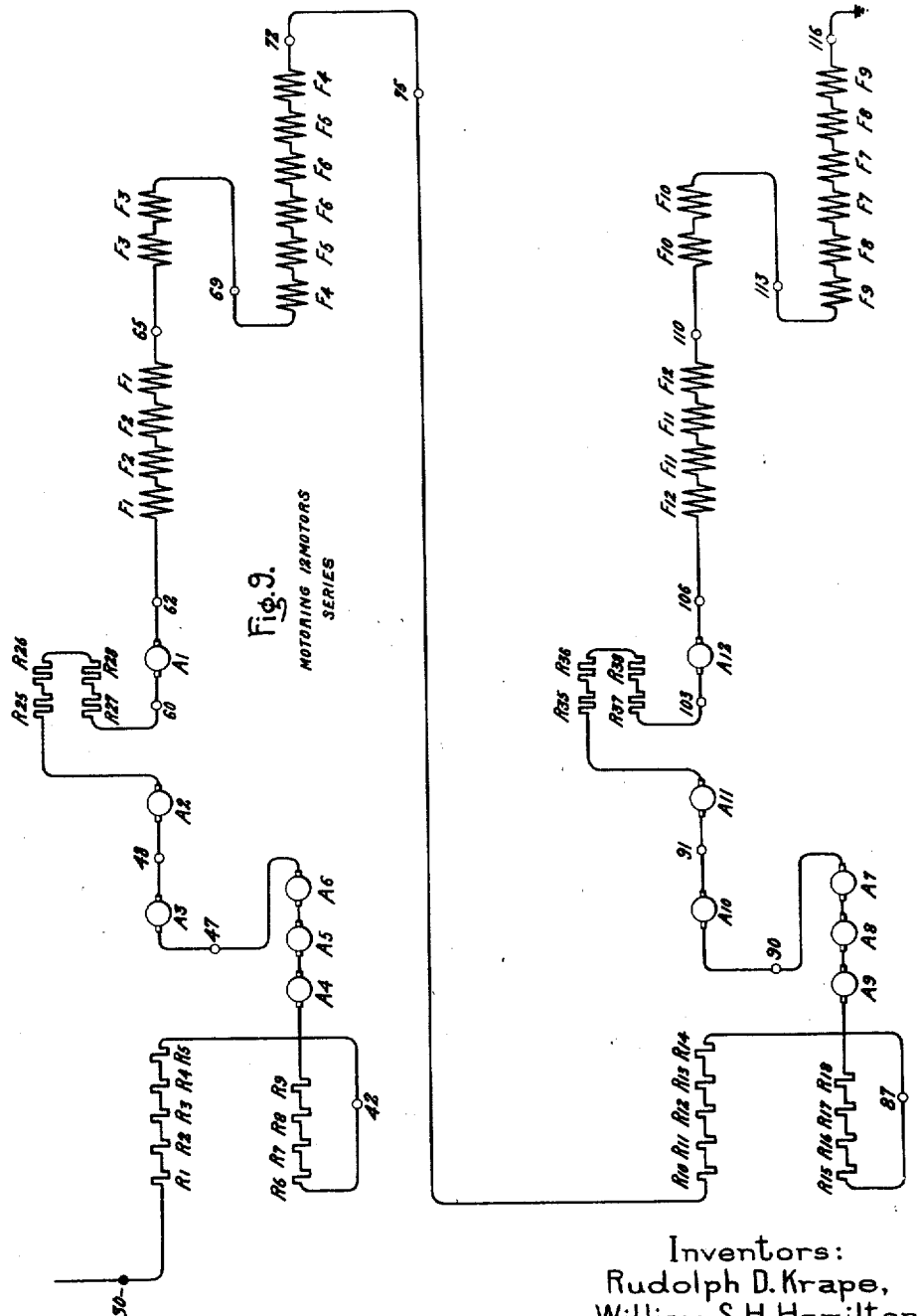

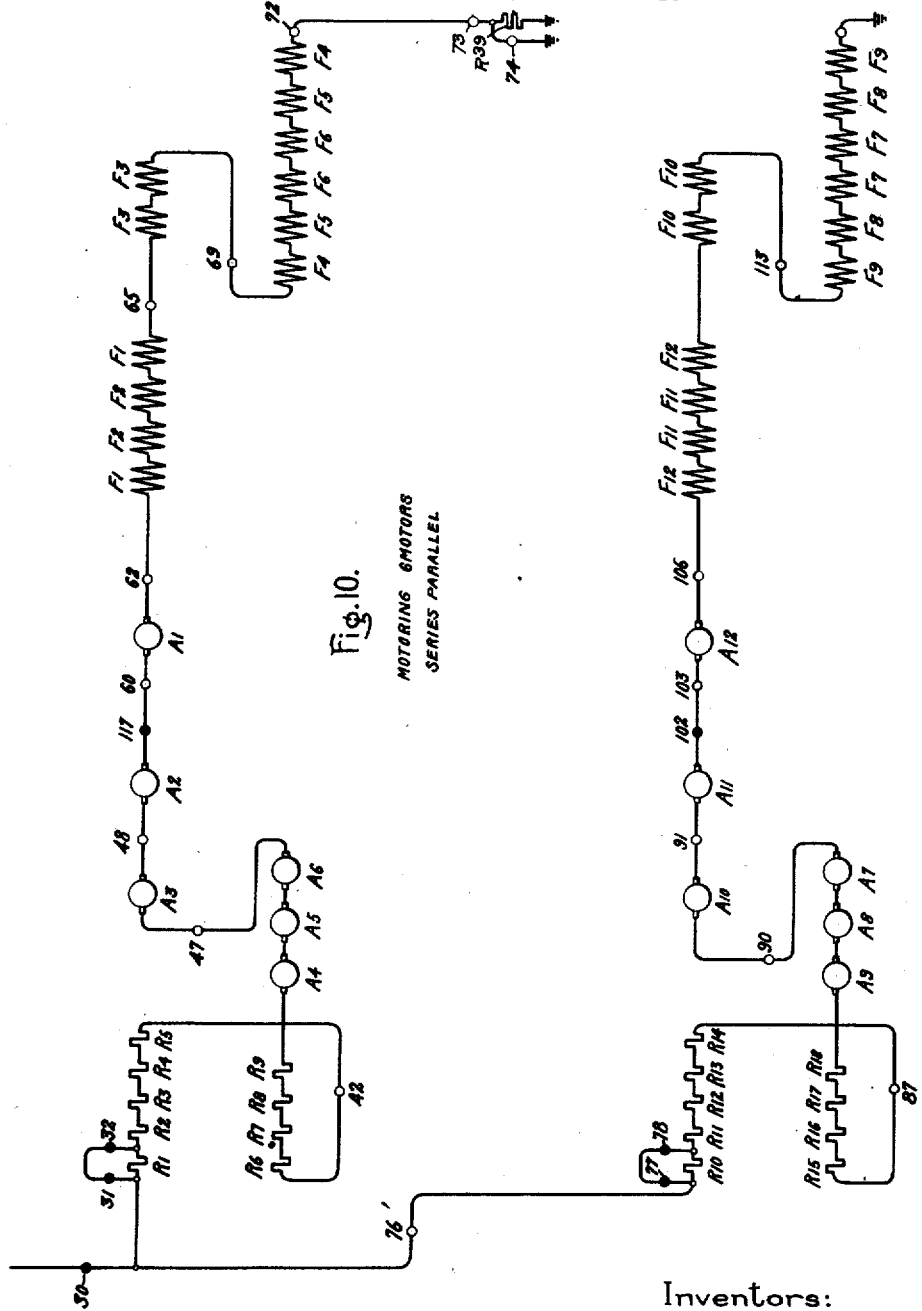

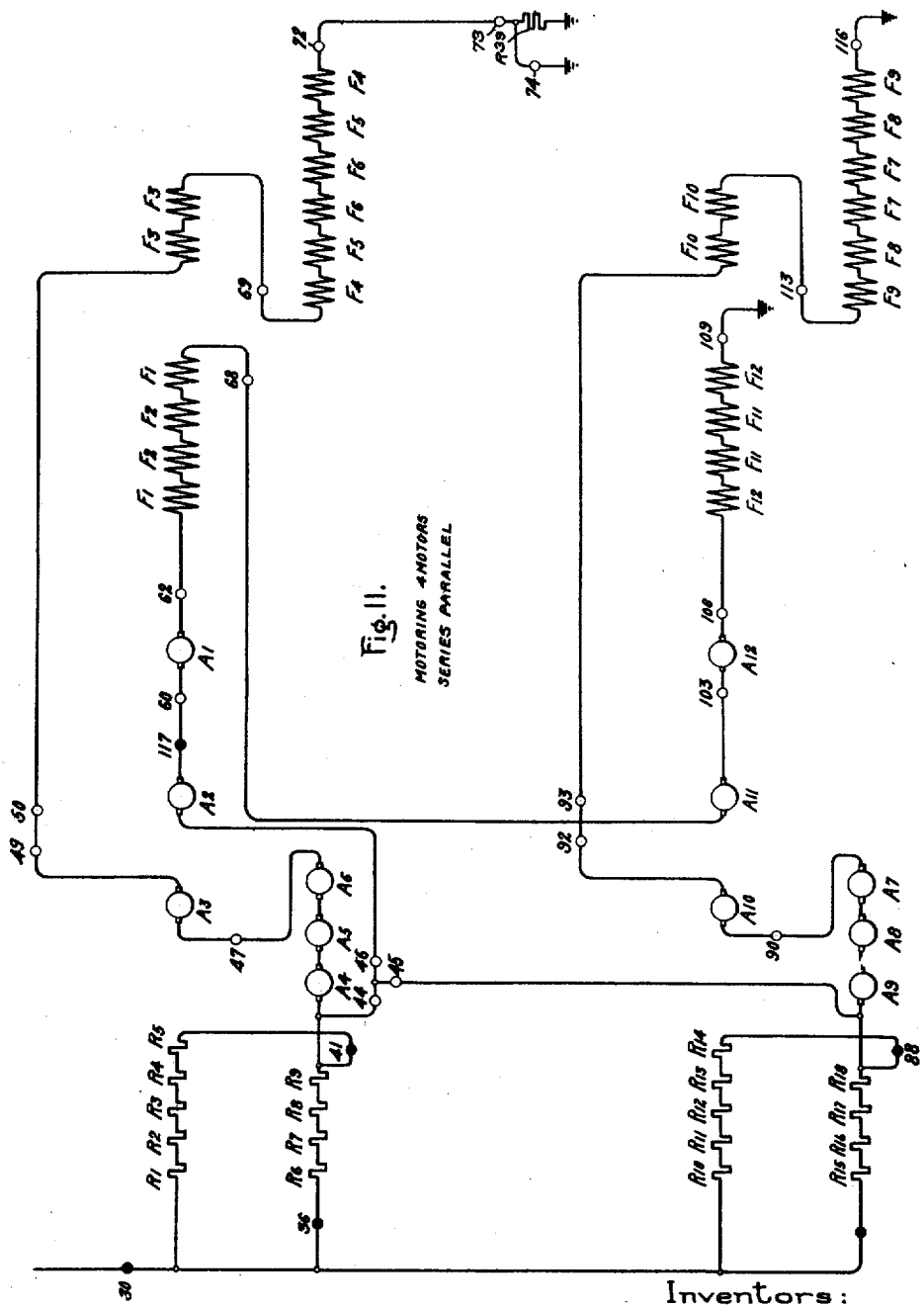

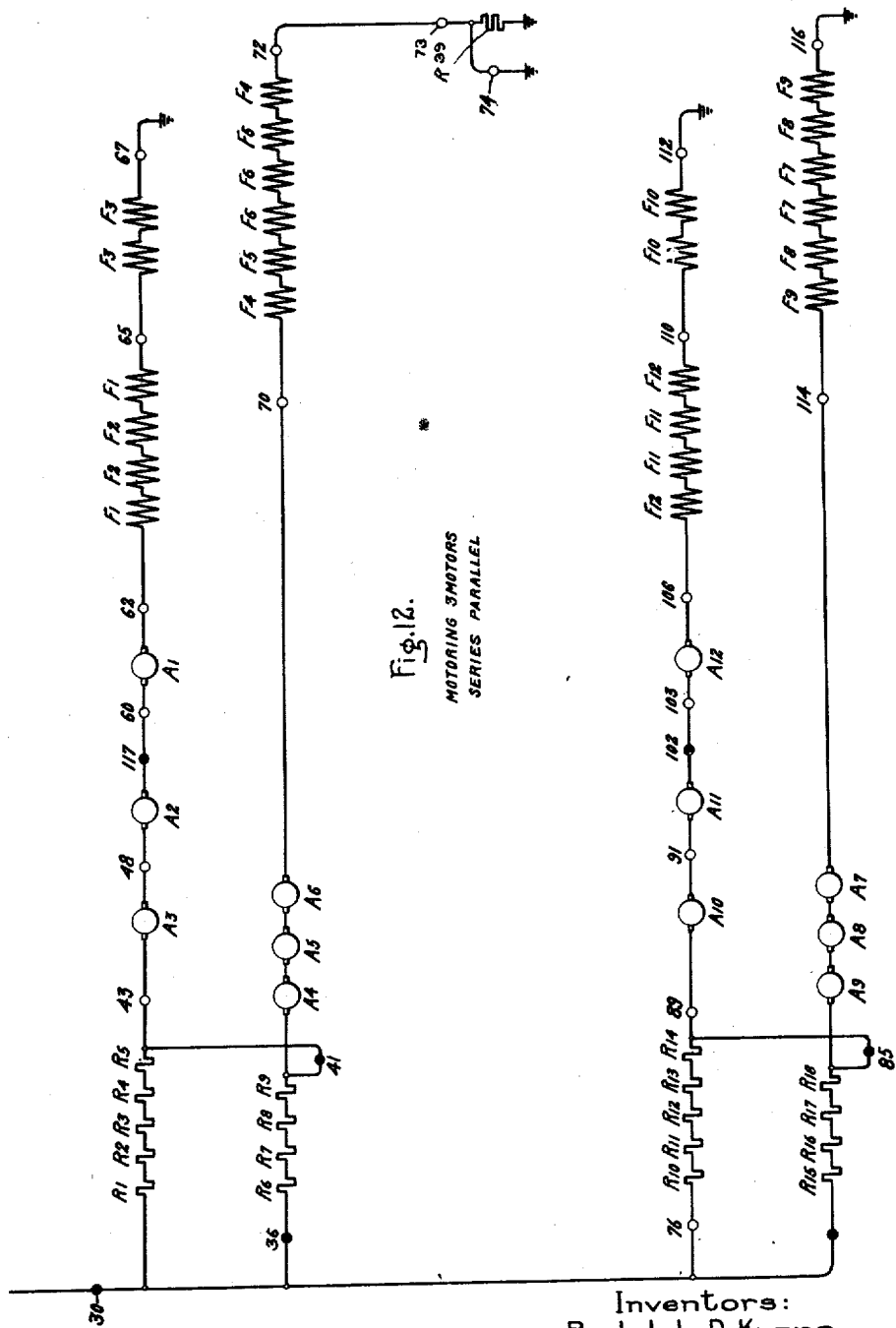

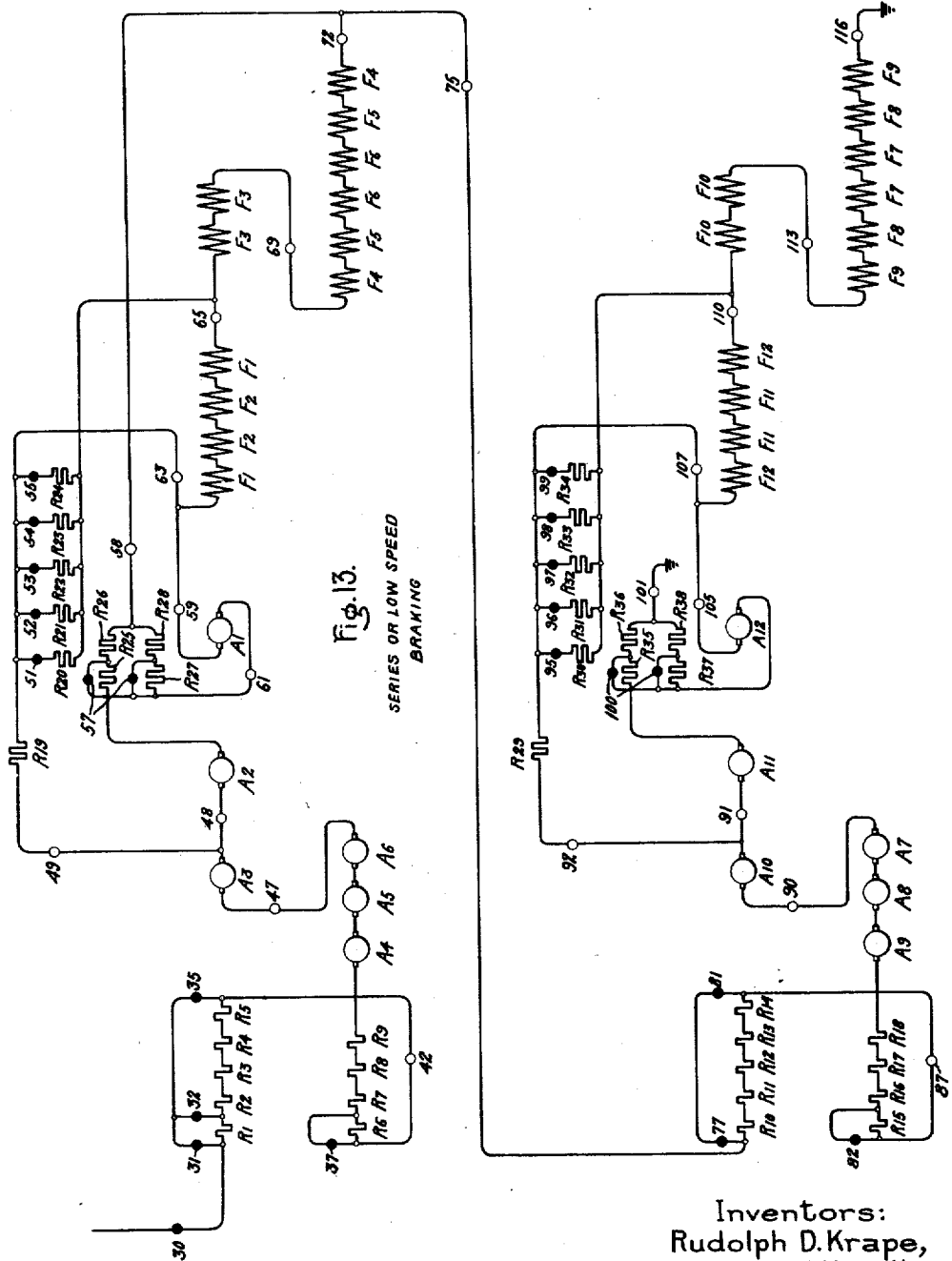

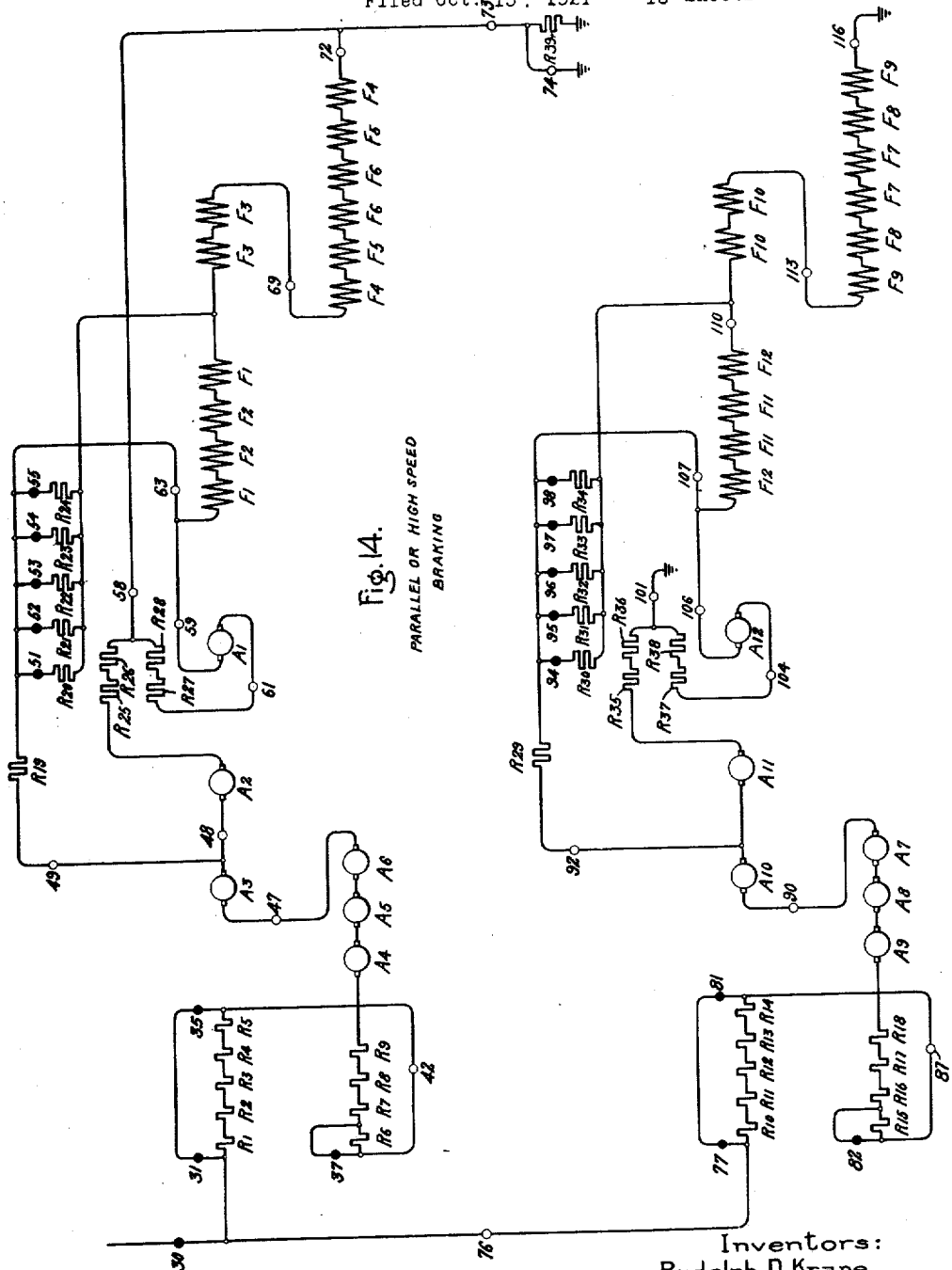

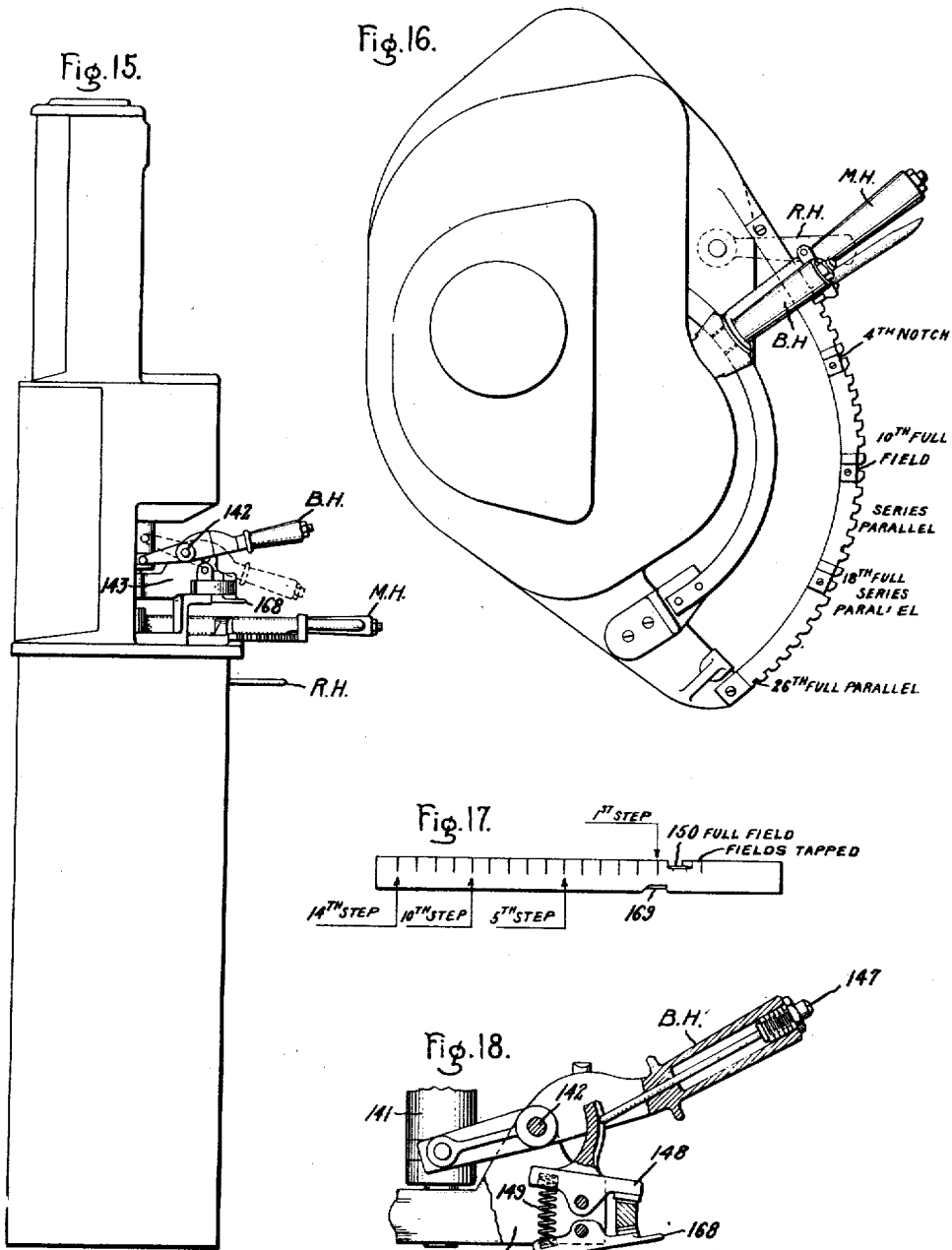

Oct. 23, 1923.  
W. S. H. HAMILTON ET AL  
1,471,893  
SYSTEM AND APPARATUS FOR POWER TRANSMISSION AND REGENERATIVE BRAKING  
Filed Oct. 15, 1921  
16 Sheets-Sheet 13
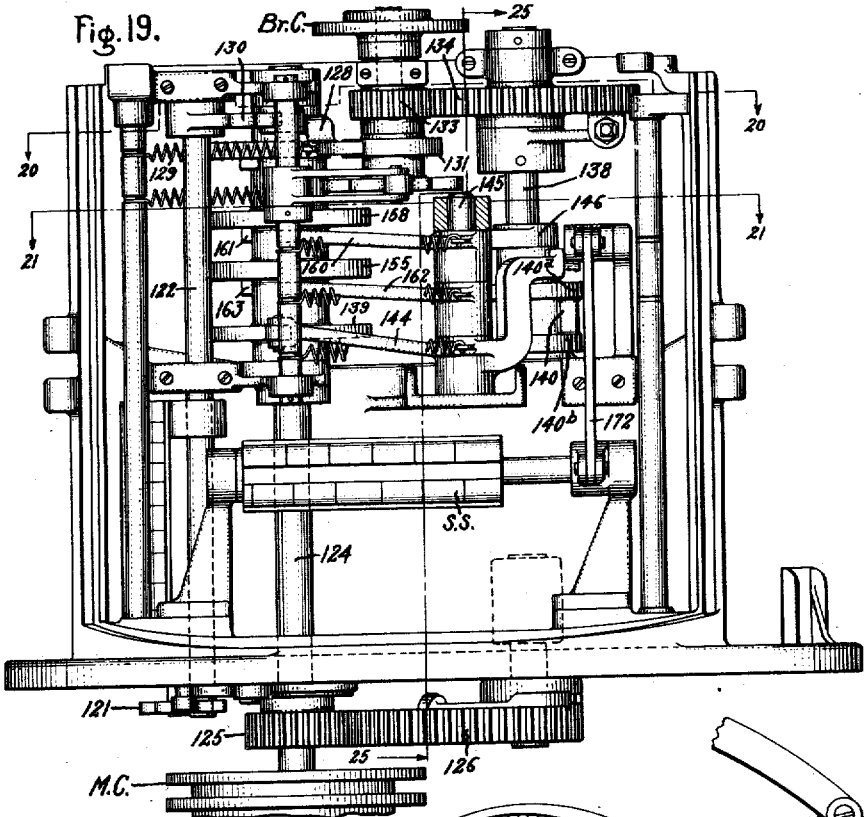
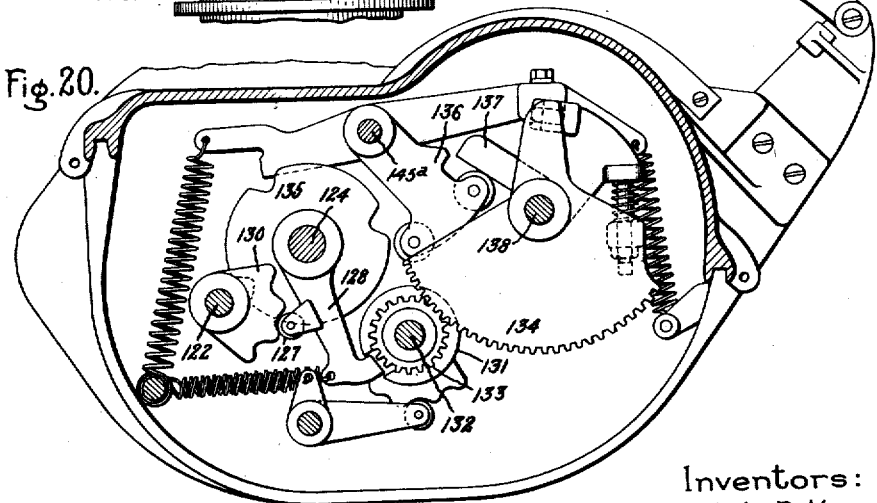
Inventors:
Rudolph D. Krape,
William S. H. Hamilton,
by Albert G. Davis
Their Attorney.

Oct. 23, 1923.
W. S. H. HAMILTON ET AL
1,471,893
SYSTEM AND APPARATUS FOR POWER TRANSMISSION AND REGENERATIVE BRAKING
Filed Oct. 15, 1921
16 Sheets-Sheet 14
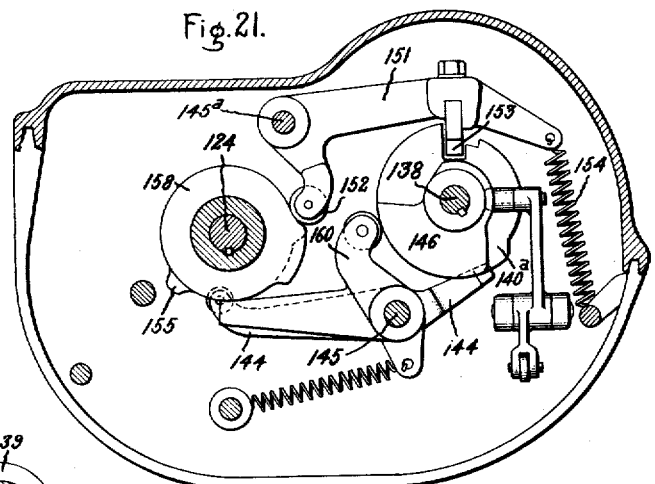
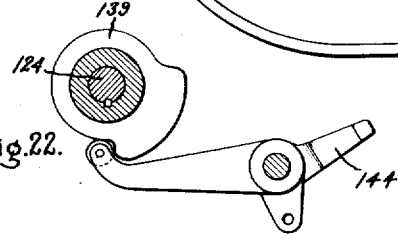
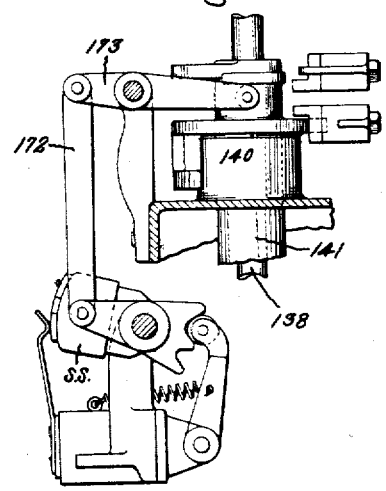
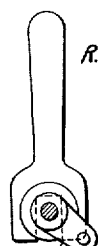
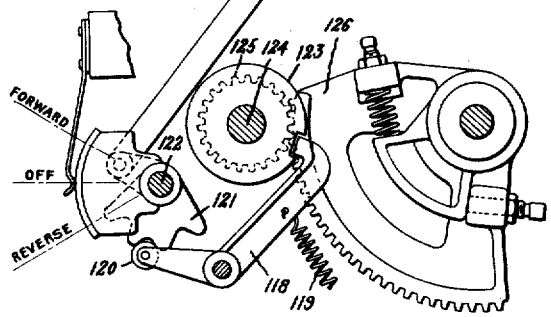
Inventors:
Rudolph D. Krape,
William S. H. Hamilton,
by Albert G. Davis
Their Attorney.

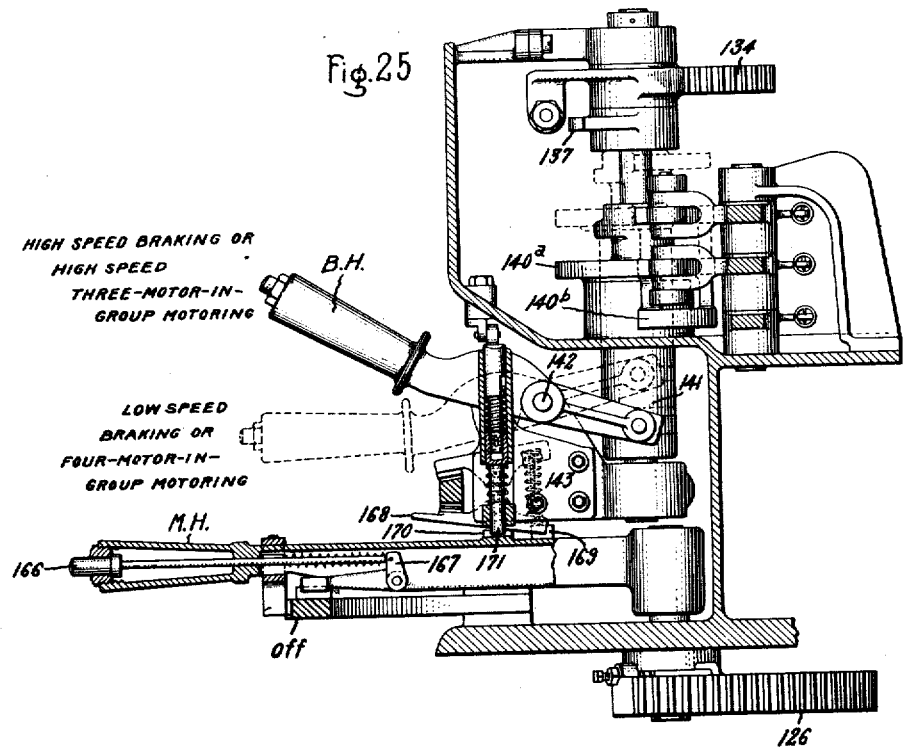
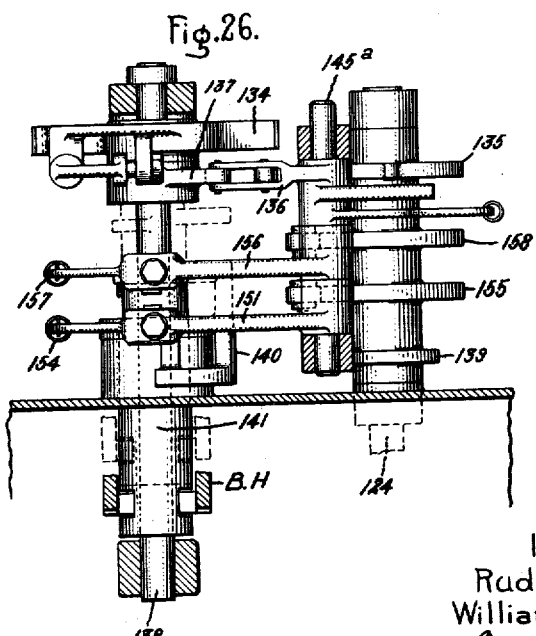

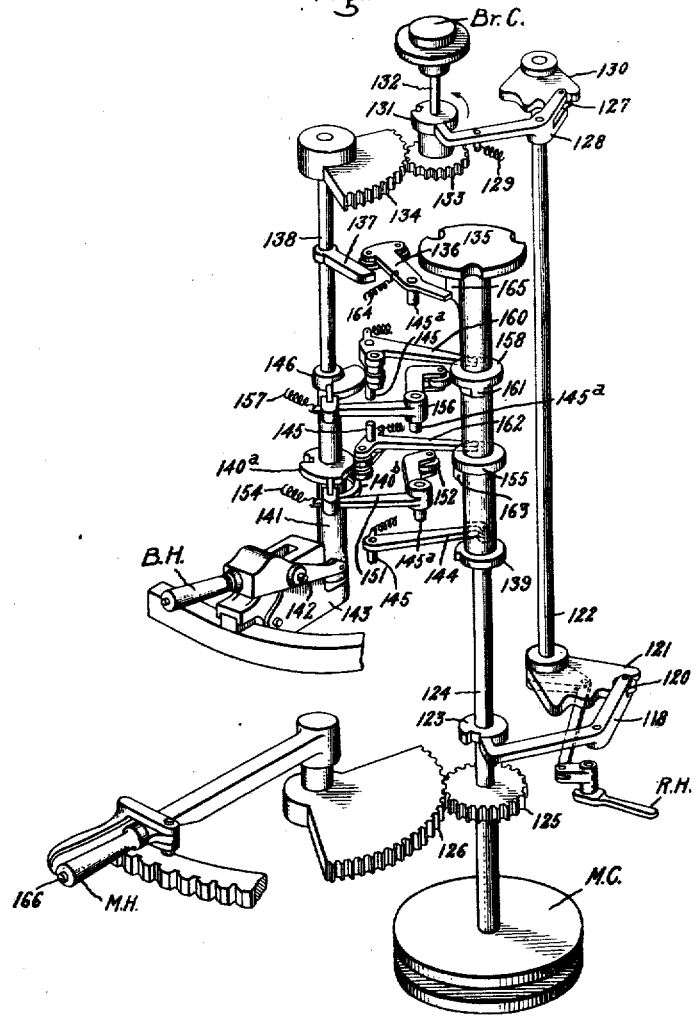

Patented Oct. 23, 1923.

1,471,893

UNITED STATES PATENT OFFICE.

WILLIAM S. H. HAMILTON AND RUDOLPH D. KRAPE, OF SCHENECTADY, NEW YORK, ASSIGNORS TO GENERAL ELECTRIC COMPANY, A CORPORATION OF NEW YORK.

SYSTEM AND APPARATUS FOR POWER TRANSMISSION AND REGENERATIVE BRAKING.

Application filed October 15, 1921. Serial No. 507,985.

*To all whom it may concern:*

Be it known that we, WILLIAM S. H. HAMILTON and RUDOLPH D. KRAPE, citizens of the United States, and residing at Schenectady, in the county of Schenectady, State of New York, have invented certain new and useful Improvements in Systems and Apparatus for Power Transmission and Regenerative Braking, of which the following is a specification.

Our invention relates to an improved system of control and control apparatus for dynamo electric machines whereby the dynamo electric machines either operate as motors to drive a load or are driven by the load and operate as generators to retard the load.

Although not limited to such use, the invention has a particular usefulness in the control of electric driving motors of an electric vehicle such, for instance, as an electric locomotive or the like. The invention provides improved means whereby the dynamo electric machines are caused to either operate as motors to drive the electric vehicle or to operate as generators to retard the vehicle. Improved means are provided whereby both the motoring and the braking effects are very nicely controlled in a simple and effective manner. Various protective features are employed for preventing the establishment of certain relations of the machines, and the control apparatus while other relations are established.

In certain of its aspects the invention relates to improvements in that type of systems of control in which a portion of the driving motors is used as an exciter for the machines, although the invention is not necessarily limited to such systems.

In another of its aspects the invention relates to systems of the above indicated character in which a plurality of dynamo electric machines are connected for series, series-parallel and parallel-motoring combinations, and also connected in what may be termed "series" and "parallel" braking relations, the object of the invention being to provide improved means whereby the speed of the vehicle may be very nicely and accurately controlled through a large speed range regardless of whether the dynamo electric machines are used to drive a load or retard a load.

Although not necessarily limited thereto, the invention has a particular application to the system for which Asa F. Batchelder filed an application for patent, Serial No. 409,647, on September 11, 1920, patented July 4, 1922, No. 1,421,894, and the improvement of that system for which Franklin H. Pritchard filed an application for patent, Serial No. 409,639, on September 11, 1920, patented July 4, 1922, No. 1,421,828, both of which patents are assigned to the same assignee to which this application is assigned.

In carrying our invention into effect in one form for the purpose of illustrating the various features of the invention, a plurality of dynamo electric machines are controlled by means of an improved controller embodying various combinations of protective features. In the embodiment of our invention which has been selected for purposes of illustration, twelve series wound dynamo electric machines are controlled in such a way that during motoring operations the machines may all be connected in series across the supply circuit, the machines then changed to an arrangement in which two multiple paths are provided with six machines connected in series in each path; a further step in the control provides for four motors in series in each of three parallel paths, and a final step provides for the establishment of four parallel circuits with three motors in series in each of the parallel paths. During regenerative braking, the machines are connected in what may be termed "series" relation, in which two groups of machines are connected in series. In each group, two of the machines are operated as self-excited exciters connected in a local circuit with the field windings of all of the machines, and with the four remaining armatures of the group connected to deliver energy to the supply circuit and connected to the closed loop in such a manner that variations in the supply circuit voltage are automatically and inherently compensated for in the manner set forth in the previously mentioned Batchelder and Pritchard applications. A further step for regenerative braking is had in which the groups of regenerative machines above described are connected in what may be termed a "parallel" relation.

In order to control the machines and prevent the establishment of certain circuits while certain other circuits are established, an improved controller is provided. This controller is provided with three handles, one of which, called the "main" handle, is provided for controlling the motoring operations, another is called the "braking" handle and is provided for the braking operations, for selecting the final connection for the motoring operation, and for determining whether motoring shall be had full field or tapped field, and the third is provided for reversing the machines. This controller preferably controls the machines by means of electromagnetic switches or contactors and also by means of electromagnetically controlled cam operated switching arrangements, although the invention is not necessarily limited to remote control arrangements. Various interlocking arrangements are provided between the respective controllers; thus, for instance—

I. The reverse handle cannot be moved from the forward or reverse position unless the main handle is in the off position.

II. The main handle cannot be moved from the off position unless the reverse handle is in the forward or reverse position.

III. The braking handle must be in the full-field position before the reverse handle can be moved from the forward to the reverse position.

IV. The braking handle cannot be moved from the full-field position unless the reverse handle is in the forward or reverse position.

V. The braking handle cannot be moved from the full-field to the tapped field position unless the main handle is in the series, series parallel, or parallel position.

VI. Movement of the main handle in either direction from the series or series parallel position, or movement of the main handle toward the off position from the parallel position, with the braking handle in the tapped-field position, causes the braking handle to be returned to the full-field position. The movement of the main handle from any position to a higher speed position causes the braking handle to be moved from the tapped field to the full-field position.

VII. The main handle cannot be moved out beyond the series parallel position unless the braking handle is in the three-motors motoring-full field or the four-motors motoring-full field position.

VIII. It is necessary to press a button in the end of the braking controller handle in order to pass from the full field to the tapped field position. It is also necessary to press this button when moving the braking handle from the full-field position to the first braking position. The arrangement is such, however, that the catches controlled by this button do not prevent movements in the opposite direction.

IX. The braking handle cannot be moved from the full-field position to the first position high speed or "parallel" braking position unless the main handle is in the series parallel position with all the resistance in circuit or the series position with all the resistance in circuit.

X. The braking handle cannot be moved from the full-field position to the first position low speed or "series" braking position unless the main handle is in the series position with a portion of the resistance cut out.

XI. The main handle cannot be moved beyond the full-series position with the braking handle in any one of its positions for establishing "series" braking.

XII. The main handle cannot be moved beyond the full-series parallel position with the braking handle in any one of its positions for establishing "parallel" braking.

XIII. The main handle cannot be moved back from the full-series or full-series parallel position toward the off position unless the braking handle is in the first position braking, the full-field position or the tapped-field position.

XIV. It is necessary to press a button in the end of the main handle to go from the fourth notch to the fifth notch, to go from full-series to series parallel, and to go from full series parallel to parallel.

XV. The braking handle can only be moved from the first position "series" or "parallel" braking position to the full field position by releasing a special latch associated with the braking handle.

XVI. The movement of the main handle from any position to the off position moves the braking handle from the first position "series" braking or the first position "parallel" braking to the full-field position.

The reasons for these and other protective features will be pointed out as the specification proceeds.

Figure 2:
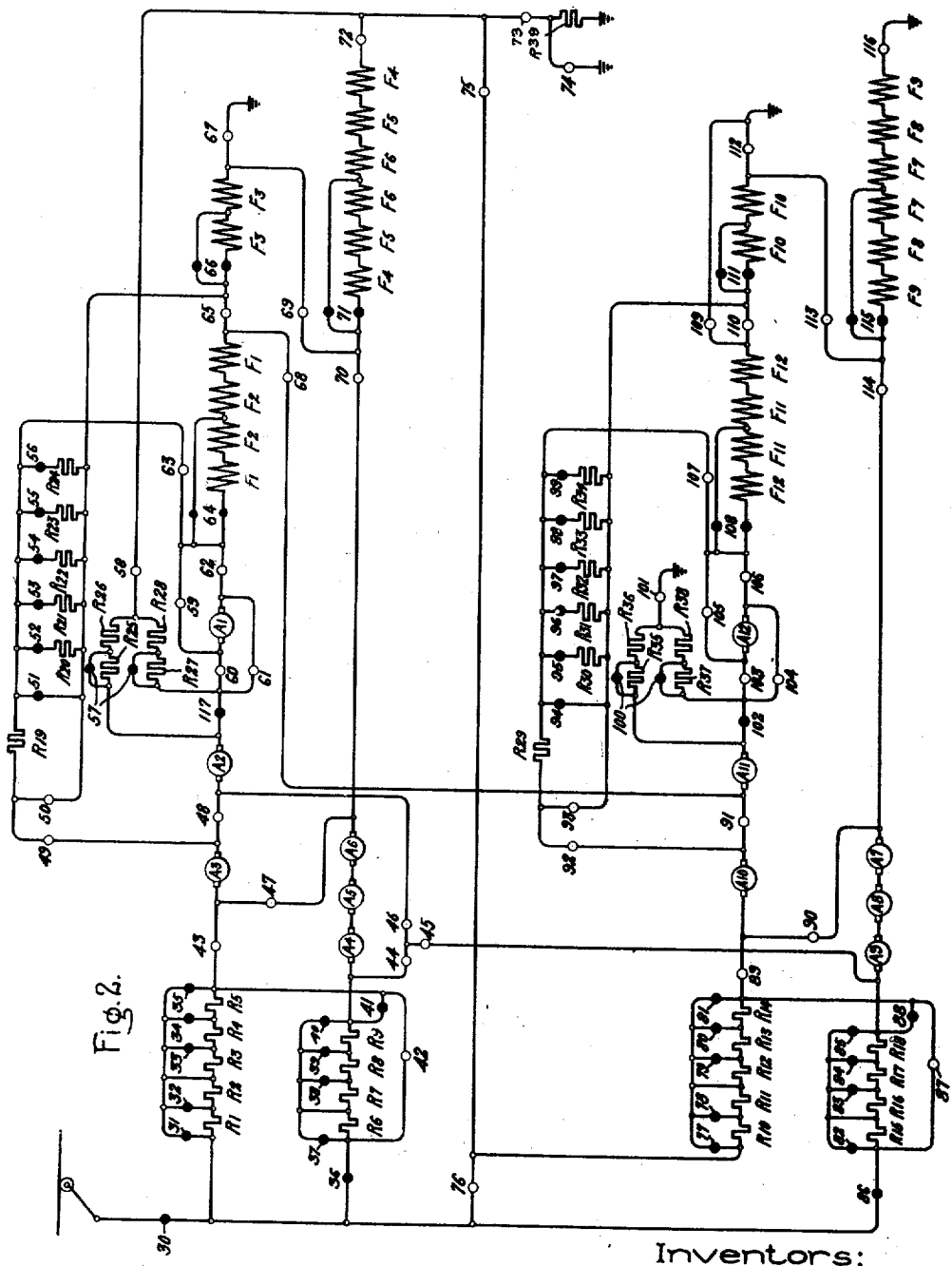
Figure 3:
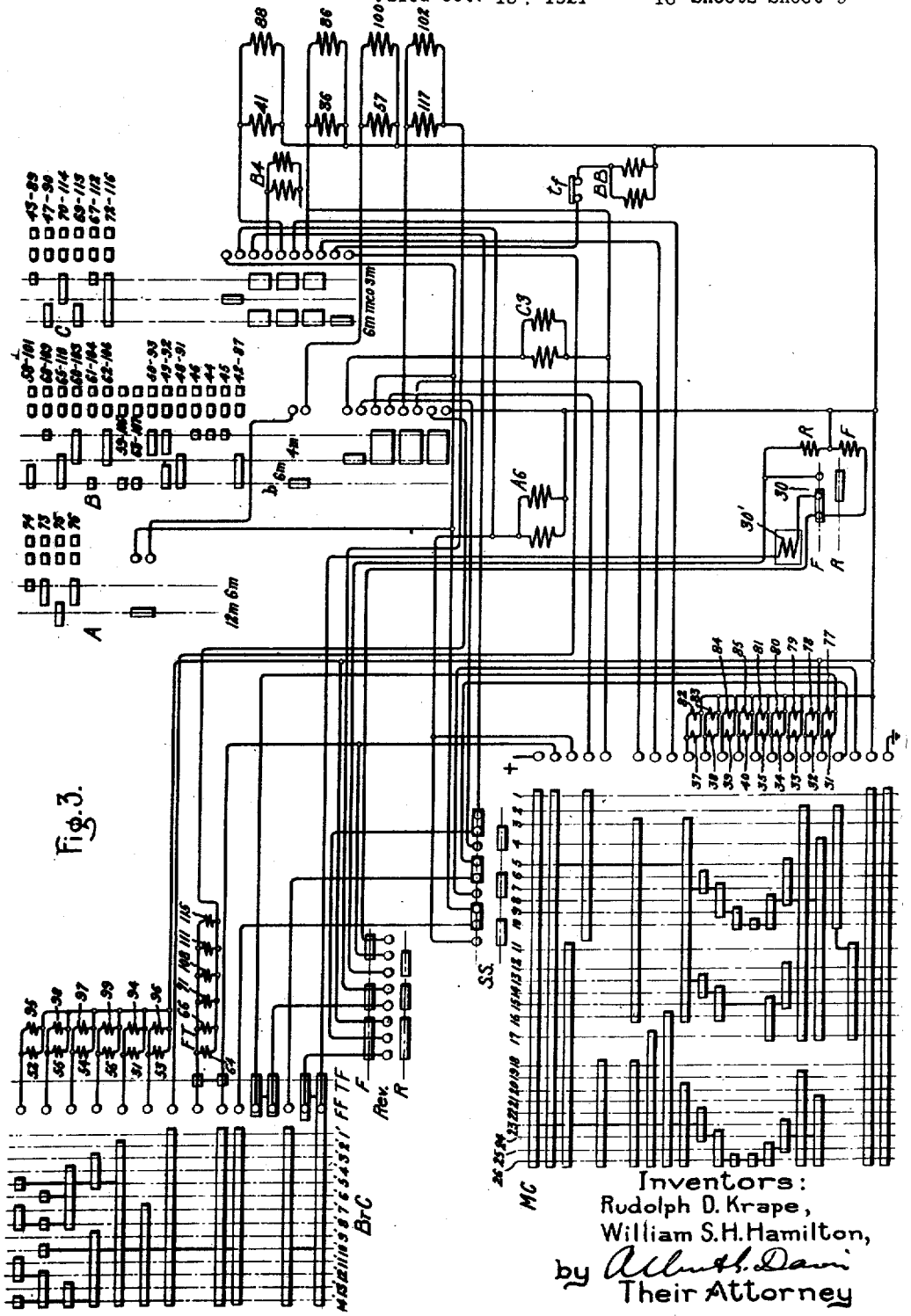
Figure 5:
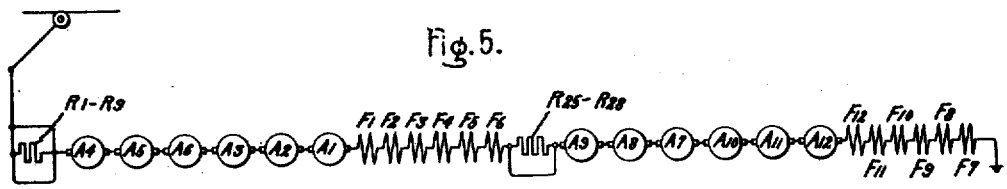
Figure 6:
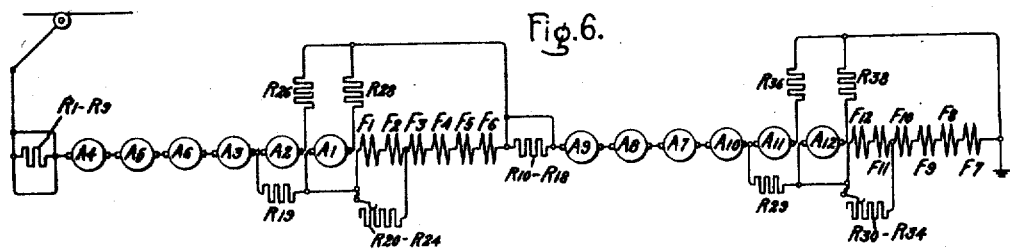
Figure 7:
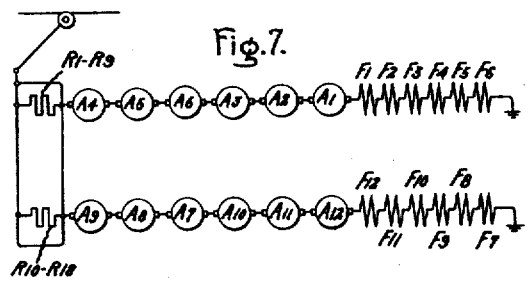
Figure 8:
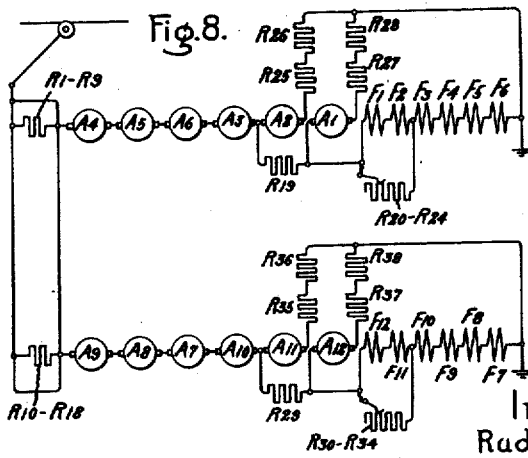

For a better understanding of the invention, reference is had to the accompanying drawings, in which Fig. 1 is a simplified diagram of the main circuit connections and the various switches for establishing the machines in the various relations heretofore referred to. Fig. 2 is a simplified diagram of Fig. 1 with the electromagnetic switches or contactors indicated by black dots and the cam operated switches by means of circles. In this arrangement of Fig. 2 the contacts of the two reversers of Fig. 1 have been omitted and the diagram simplified as much as possible in order to obtain a quick understanding of the arrangement. Fig. 3 is a simplified diagram showing the main controller, together with the control circuits, for controlling the switches illustrated very diagrammatically in Fig. 1. Fig. 4 is a table showing the switches which are closed in various positions of the controller by the operation of the main and the braking handles. Fig. 5 is a very simplified diagram showing the connections established for motoring with twelve motors in series relation. Fig. 6 is a very simplified diagram of the connections established for "series" braking; Fig. 7 is a very simplified diagram showing the series parallel connections established for motoring with six motors in series in each of two parallel paths. Fig. 8 is a very simplified diagram of the main circuit connections for "parallel" braking. Figs. 9 to 14 inclusive are simplified diagrams of Fig. 2 showing the various switches which are closed to establish various relations of the machines. Fig. 9 shows the arrangement for series motoring with twelve motors connected in series relation. Fig. 10 shows the parallel motoring connection with six motors in series in each of the parallel paths. Fig. 11 shows the arrangement with four motors in series in each of the three parallel paths. Fig. 12 shows the arrangement with three motors in series in each of the four parallel paths for motoring. Fig. 13 shows the arrangement for "series" braking, and Fig. 14 shows the arrangement for "parallel" braking. Figs. 15 to 27 inclusive are views showing the controller and its various interlocking devices. Fig. 15 is a side view of a controller embodying our invention. Fig. 16 is a top view of the same. Fig. 17 shows the control sector for the brake handle. Fig. 18 is a side view of the brake handle partially in cross section. Fig. 19 is a rear view of the controller with the casing removed showing the interlocking devices. Fig. 20 is a section view along the line 20—20 of Fig. 19 looking in the direction of the arrows. Fig. 21 is a section view along the line 21—21 of Fig. 19 looking in the direction of the arrows. Fig. 22 is a view of the interlocking arm and cooperating cam of Fig. 21. Fig. 23 shows the interlocks between the brake handle and the main handle. Fig. 24 is an end view of the selective drum and operating mechanism therefor which is controlled by the brake handle and by means of which the three-motor or four-motor parallel connections during acceleration may be selected and also the series and the parallel regenerative braking connections. Fig. 25 is a sectional view of Fig. 19 along the line 25—25 looking in the direction of the arrows showing the interlocks cooperating with the brake handle, the brake handle, and a cross section view of the main handle and the direct interlock between the main handle and the brake handle. Fig. 26 is a front view of certain of the interlocks, a rear view of which is shown in Fig. 19, while Fig. 27 is an exploded view for the purpose of showing the relative location of certain of the interlocks shown in Figs. 19 to 26 inclusive. The shapes of certain of the parts and the relative location of the parts have been in certain cases changed from the arrangement shown in the other figures in order to make it possible to show this exploded view of the controller. However, the principle of operation is the same in the exploded view as in the other views.

*Control mechanism in general.*

Referring to the drawings and in particular to Fig. 3, the motors are controlled by means of a main controller MC having an off position and twenty-six operative positions. This main controller is provided for controlling electromagnetic switches and for controlling electromagnetically controlled cam switches for establishing the motors in various relations. For the purpose of simplicity, only the windings of the switches are shown and the numerals applied to these windings also designate the corresponding switches shown on Fig. 1. Associated with this main controller is a selective switch designated SS on the drawing. By means of this selective switch the motors are connected so that the final motoring positions of the main controller will be either four motors series parallel or three motors series parallel, depending on whether the upper or lower contacts are in engagement with their respective contacts. During braking, when the selective switch is in its upper position, the connections are established for low speed or "series" braking, and when the selective switch is in its lower position the connections are established for parallel or high speed braking. The reverser designated Rev. on the drawing is provided for controlling electromagnetic devices which effect the change of the connections for the dynamo electric machines for either forward or reverse operation. When the reverser is thrown to its upper position the connections are established for forward operation and when thrown to the lower position, for reverse operation. The braking controller designated BrC is provided with fourteen operative positions designated 1' to 14' inclusive, an off position and a tapped field position designated TF upon the other side of the off position. This controller governs electromagnetic switches, the windings of which are designated by numerals which correspond to the numerals of switches shown on Fig. 1. The braking controller is operated by the same handle which controls the selective switch; in other words, after the selective switch has been thrown to either its upper or lower position, the handle for this switch can be rotated to regulate the braking effect in a plane at right angles to the plane to which the selective switch contacts are moved. The switch cylinder designated A on the drawing is provided for establishing either the six-motor or the twelve-motor connections for motoring. This switch is electroresponsively controlled by means of the master controller MC. The switch is normally biased to the $12^m$ position in which the connections are made for twelve motors connected in series relation. Electromagnetic operating means, the windings of which are designated $A^6$ on the drawing, are provided for throwing the A switch over from the $12^m$ position to the $6^m$ position in which six motors are connected in series relation. The A cylinder controls cam switches which are designated by numerals which correspond to the numerals designating cam switches on Fig. 1 of the drawings.

The cylinder designated B on the drawings is provided with three operative positions, one of which is designated by the letter $b$, the middle of which is designated by $6^m$ and the other of which is designated by $4^m$. This B cylinder is biased to its midposition, namely, that in which six motors are connected in series relation motoring, and is moved under the control of the windings designated $B^4$ to the $4^m$ position at which four motors are connected in series relation for motoring. The B cylinder is movable under the control of the windings designated BB to the $b$ position at which connections of the motors are established for regenerative braking. This switch is provided with segments, shown in their developed form on the drawing, which control cam switches (not shown). For purposes of illustration the cam switches are shown diagrammatically, and these cam switches are designated by two sets of numerals, the numeral's corresponding to cam switches designated by similar numerals in Fig. 1. Thus, for instance, the upper segment of the B cylinder simultaneously operates the cam switches 58 and 101 shown in Fig. 1. The B cylinder is thrown to the braking position designated $b$ under the control of the magnet windings BB when the braking controller BrC is in an operative position and the windings FT of the switch for establishing the tapped field relation of the motors are deenergized and the contact $tf$ is closed.

The C cylinder is provided with three operative positions, the first of which is designated $6^m$, the middle of which is designated $mco$, and the right hand position of which is designated $3^m$. In the $6^m$ position, six of the dynamo electric machines are connected in series relation, in the $mco$ position certain of the motors are cut out of circuit, and in the third position three motors are connected in series relation. It will be understood that the segments of the C solenoid likewise control cam switches designated by numerals which correspond to cam switches designated by the same numerals on Fig. 1. The C cylinder is biased to the six-motor position and is movable to the $3^m$ position under the control of electromagnets, the windings of which are designated $C^3$.

The arrangement of the A, B and C cylinders is such that in case it is desired to operate with twelve motors in series relation, the A cylinder will be in its $12^m$ position, the B cylinder in its $6^m$ position, and the C cylinder in its $6^m$ position. In order to operate the motors series parallel, the A cylinder will be thrown to its $6^m$ position with the B cylinder and the C cylinder remaining as before in their $6^m$ positions. In order to operate the motors series parallel with four motors in series in each of the parallel branches, the A cylinder will be in its $6^m$ position, the B cylinder in it $4^m$ position and the C cylinder in its $6^m$ position. In order to operate the motors three motors in series in each of four parallel branches, the A cylinder will be in its $6^m$ position, the B cylinder in its $6^m$ position and the C cylinder in it $3^m$ position. In order to operate the dynamo electric machines as regenerative braking generators, the A cylinder will be in its $12^m$ position, the B cylinder in its $b$ position, and the C cylinder in its $6^m$ position. This will establish "series" or low speed regenerative braking connections. In order to establish "parallel" or high speed regenerative braking connections, the A cylinder will be thrown to the $6^m$ position, the B cylinder to the $b$ position, and the C cylinder to the $6^m$ position.

It will be observed that the electromagnetic line switch 30 has a short circuited secondary winding 30'. This winding is provided for the purpose of magnetically maintaining the connection to the supply circuit for an interval of time after the main controller is returned to the off position. That includes all the resistance in the motor circuits and thus reduces the motor current, at the same time giving the current in the motor fields sufficient time to decrease to a small value before the circuit is opened. The line contactor is thus required to interrupt a comparatively small current.

*Series motoring.*

Referring now to Fig. 1, 2, 3 and 4, the arrangement is such that ten acceleration steps for the main controller MC are provided with twelve motors in series. The switches which are closed and the sequence of the closing of the switches are shown in the table of Fig. 4, and it is believed that those skilled in the art will not need a detailed tracing out of the control circuits of Fig. 3 whereby the electromagnetic switches or contactors which are closed at the various steps of the control. In general, it may be stated that the connection is that shown in very simplified diagram in Fig. 5. The dynamo electric machines are shown as having armatures $A^1$ to $A^{12}$ inclusive and corresponding field windings $F^1$ to $F^{12}$ inclusive. The series fields of the machines are in two sections, as shown in Fig. 1 and other of the figures. For example, the series field corresponding to armature $A^1$ has one portion designated $F^1$ and another portion designated $F^2$, and the field is sectionalized in this way so as to give a "tapped" field connection for high speed operation motoring. In Fig. 1 the contactor 64 is provided for either connecting both sections of series fields $F^1$ and $F^2$ in series in its lower position or deenergizing a section of each of the two fields in its upper or attracted position. The contactor 66 is provided for a similar purpose for the field $F^3$, the contactor 71 is provided for giving a tapped field connection for the fields $F^4$, $F^5$ and $F^6$, the contactor 108 for giving a tapped field connection for the fields $F^{12}$ and $F^{11}$, the contactor 111 for giving a tapped field connection for the field $F^{10}$, and the contactor 115 for giving a tapped field connection for the fields $F^9$, $F^8$ and $F^7$. These field tapping contactors are controlled by the braking controller $B^rC$ and are energized in the TF position of the controller.

Assume that the selective switch SS is in the position shown in the drawings, the reverser Rev. is thrown to the forward (F) position. The A commutating cylinder is in its normal or $12^m$ position, the B commutating cylinder in its normal or $6^m$ position, and the C commutating cylinder in its normal or $6^m$ position, and the main controller is turned to its first position. It will be seen from Fig. 4 that the cam switch 75 is closed on the A cylinder, the cam switches 65, 110, 62 106, 48, 91, 42, 87, will be closed on the B cylinder, and the cam switches 47, 90, 69, 113, 72 and 116 will be closed on the C cylinder. The line contactor 30 will also be closed. The connections now will be as shown in simplified diagram in Fig. 9, and the circuit from the motors will be from the supply circuit through line contactor 30, accelerating resistors $R^1$ to $R^5$ inclusive, cam switch 42, accelerating resistors $R^6$ to $R^9$ inclusive, armatures $A^4$, $A^5$ and $A^6$, cam switch 47, armature $A^3$, cam switch 48, armature $A^2$, resistors R25, 26, 28 and 27, cam switch 60, armature $A^1$, cam switch 62, motor fields $F^1$ and $F^2$, cam switch 65, motor field $F^3$, cam switch 69, motor fields $F^4$, $F^5$ and $F^6$, cam switch 72, cam switch 75, resistors $R^{10}$ to $R^{14}$ inclusive, cam switch 87, resistors $R^{15}$ to $R^{18}$ inclusive, armatures $A^9$ to $A^7$ inclusive, cam switch 90, armature $A^{10}$, cam switch 91, armature $A^{11}$, resistors $R^{35}$, $R^{36}$, $R^{38}$, and $R^{37}$, cam switch 103, armature $A^{12}$, cam switch 103, armature $A^{12}$, cam switch 106, motor fields $F^{12}$ and $F^{11}$, cam switch 110, motor field $F^{10}$, cam switch 113, motor fields $F^9$, $F^8$ and $F^7$, cam switch 116 to the return contactor of the supply circuit.

In order to avoid a very lengthy description of all of the various circuits established by the operation of the various controllers, a large number of simplified diagrams of the various circuits established in the various positions of the controllers have been shown. All of the various switches in the main circuits are shown in Fig. 1, and Fig. 2 has been prepared with the idea of simplifying as much as possible the arrangement of Fig. 1. In this figure and in subsequent figures, the black dots indicate electromagnetic switches or contactors and the circles indicate cam switches. Various resistors for controlling the dynamo electric machines are shown in the conventional way. Fig. 9 is a still further simplification of the arrangement of Fig. 2, and shows merely the main circuits which are established when the main controller MC is in its first operative position. It is believed that with this elaboration in the way of simplifying the various connections, those skilled in the art will readily understand the invention by the aid of these simplified diagrams more readily than by a detailed tracing of the various circuits.

When the main controller is moved to its second position, it will be found by reference to Fig. 4 that the resistance contactors 32 and 78 are closed. The contactor 32 will short circuit the resistor $R^2$ and the contactor 78 will short circuit the resistor $R^{11}$, and the motors will be accelerated in a manner well understood by those skilled in the art. By reference to Fig. 4, it will be seen that moving the main controller through its successive positions to the tenth position gradually short circuits the resistors in the motor circuit step by step until finally the resistors are all shorted and the motors are connected directly to the supply circuit with full potential applied.

*Series parallel motoring.*

In order to establish a six-motor series parallel connection, shown in very simplified diagram in Fig. 7, the main controller will be turned to its eleventh position. The B and C cylinders will remain in their previous positions, but the windings $A^6$ will be energized to throw the A cylinder to its $6^m$ position, thereby closing the cam switches 74, 73 and 76 and opening the cam switch 75. The motors will thereupon be connected in the relation shown in Fig. 10, in which the machines having armatures A¹ to A⁶ inclusive and series fields F¹ to F⁶ inclusive are connected in series relation in one branch of the multiple circuit and the remainder of the machines are connected in series relation in another branch of the multiple circuit. Certain of the resistors which had been short circuited in the tenth or final series position are now reinserted, viz resistors R² to R⁹ inclusive inserted in series with the motor in one branch of the parallel circuit, and the resistors R¹¹ to R¹⁸ inclusive are reinserted in the circuit in the other branch of the parallel circuit. The main circuit connections are shown in simplified diagram in Fig. 10. Moving the main controller through its successive operating position to the seventeenth position gradually short circuits the accelerating resistors and connects the motors to the line with full potential applied.

High speed series parallel motoring.

Assume that the upper contacts of the selective switch SS are in engagement with their respective stationary contacts, as shown in Fig. 3, in case the main controller is moved from its seventeenth to its eighteenth position, the windings B⁴ in Fig. 3 of the B cylinder are energized to throw the B cylinder to its 4ᵐ position, thereby opening up the cam switches 65 and 110, 48 and 91, and 42 and 87, and closing the cam switches 68 and 109, 50 and 93, 49 and 92, and 46, 44 and 45. The connections will now be as shown in simplified diagram in Fig. 11. It will be seen that the motors are now connected in three parallel paths with four motors in each of the parallel paths, and certain of the resistors have been reinserted in the circuit in order to protect the motors. Moving the main controller through its successive operating positions gradually short circuits the various resistors in the sequence shown on Fig. 4, until finally when the twenty-sixth position is reached, the motors are connected four in series in three multiple paths directly to the supply circuit with all of the accelerating resistors short circuited.

Highest speed series parallel motoring.

In case the selective switch SS had been originally thrown so as to bring its lower set of contacts into engagement with the stationary contacts, the various connections established by the operation of the main controller up to the seventeenth position would be the same as those previously described generally and shown specifically on the drawings, Figs. 9 and 10. However, in this case the movement of the main controller to the eighteenth position will energize the magnets C³ to throw the C cylinder to its 3ᵐ position and establish the motors in four parallel paths with three motors in series in each path as shown in simplified diagram in Fig. 12. The movement of the main controller through its successive operative positions to its twenty-sixth position will gradually short circuit the resistors in the multiple paths until finally the motors are connected three in series in four multiple paths directly to the supply circuit with full potential applied.

Field variation or field tapping.

The previous described arrangements have all been for full field motoring operation. In order to obtain higher speeds in each connection of the motors than can be obtained by means of the full field connections, it is possible to cut one-half of the series field winding of each motor out of the circuit or "tap" the fields. This can be done only in one of the running positions. That is, the 10th position where all 12 motors in series are connected directly to the trolley without any accelerating resistance in the circuit; the 17th where two groups of six motors in series each are connected directly across the trolley and the 26th where either three groups of four motors in series each or four groups with three motors in series each are connected directly across the trolley. The reason for allowing "tapped" field operation only in these running positions is to prevent an attempt on the part of the engineer to operate the locomotive with "tapped" field connections and part of the accelerating resistance in the circuit which is inefficient as the speed increase obtained is sufficient not to warrant the losses in the accelerating resistances incurred.

In order to established the "tapped" field arrangement with the main controller MC on either the 10th, 17th or 26th positions, the brake controller BrC is thrown so as to make engagement with its contact segments to the right of the full field position at the position designated TF. The field tapping switches 64, 66, 71, 108, 111 and 115 are thereby energized to first shunt one of the two sections of each series field and then finally open the shunt connection leaving but one section of each series field in circuit.

Arrangement is further made so that in in case while operating in the tapped field connection, the main controller MC should be turned in either direction from the 10th and 17th positions and toward the "off" position from the 26th position, the brake controller BrC will be returned from the TF position to the full field position. This arrangement is provided to prevent operation at any time with the accelerating resistance in circuit and also to insure that at all times when the main controller MC is turned from its "off" position to the first position that full field motoring connections will always be obtained. This insures always obtaining the maximum amount of torque from the motors.

"Series" regenerative braking.

Assume that the various switches and controllers are in their respective positions shown in Fig. 3, and that it is desired to operate the machines as regenerative braking generators, the reverser Rev. will be thrown, for example, to the F or forward position. The main controller MC will then be turned to either of its first four operative positions. This will cause the machines to operate as motors momentarily and the counter E. M. F. of the machines will be opposed to the supply potential. In other words, the potential of the machines will be built up in the proper direction so that the polarity of the machines will not be reversed before beginning regenerating. The braking controller can then be moved throughout its operative positions to cause the regenerating action. With the selector switch SS in the position shown in the drawings, when the braking controller is turned to its first operative position the magnet windings BB are energized to throw the B cylinder to the $b$ position and the machines are then arranged as shown in Fig. 13, and as shown in very simplified diagram in Fig. 6. This will establish what we shall call "series" regenerative braking connections since there are two groups of regenerating machines in series relation. It will be seen that the motor armatures $A^4$, $A^5$, $A^6$ and $A^3$ are connected in series with the armatures $A^1$ and $A^2$ connected in multiple, that the resistor $R^{26}$ is in series with the armature $A^2$ and the resistor $R^{28}$ is in series with the armature $A^1$, and that the resistor $R^{19}$ is included between the armatures $A^1$ and $A^2$ to establish the multiple connection of these armatures. This resistor $R^{19}$ provides a means whereby desirable speed torque characteristics for the dynamo electric machines during regenerative braking are obtained over a wide range of operating speeds. This resistor will be termed an "equalizing" or "stabilizing" resistor, since by reason of this resistor, the values of the resistors $R^{26}$ and $R^{28}$, which are termed "balancing" resistors, may be determined without regard for the unstable speed torque braking characteristics which would be obtained at certain speeds. The armatures $A^1$ and $A^2$ are connected in a local circuit with the fields $F^1$ to $F^6$ inclusive to operate as exciters for these field windings. The resistors $R^{20}$ to $R^{24}$ are included in a shunt circuit to the fields $F^1$ and $F^2$, the exciter field windings. These resistors $R^{20}$ to $R^{24}$ inclusive are arranged to be connected in multiple by the closing of their respective switches 51 to 55 inclusive, and these resistors provide a means for varying the excitation of the exciters to thereby control the braking effect. This braking control arrangement shown generally in Fig. 6, and more specifically in Fig. 13, is the invention which Asa F. Batchelder has claimed broadly in his said Patent No. 1,421,894, and the improvement of that system for which the said Franklin H. Pritchard obtained the said Patent No. 1,421,828. The machines having armatures $A^9$ to $A^{12}$ inclusive are connected as a group in a similar relation to the machines having armatures $A^1$ to $A^6$ inclusive. These two groups are connected in series relation, and the term "series" braking has therefore been applied to this connection. Moving the main controller MC through its successive operative positions to the tenth position gradually short circuits the resistors $R^1$ to $R^5$ inclusive, $R^6$ to $R^9$, $R^{10}$ to $R^{14}$, and $R^{15}$ to $R^{18}$, thereby cutting out these limiting resistors and connecting the machines for series braking directly across the supply circuit. The braking controller will now be moved through its successive operative positions to thereby gradually connect the resistors $R^{20}$ to $R^{24}$ inclusive in multiple with each other and thereby vary the current flowing through the exciter fields $F^1$ and $F^2$, and the resistors $R^{30}$ to $R^{34}$ inclusive will be gradually connected in multiple with each other across the exciter fields $F^{11}$ and $F^{12}$ to thereby regulate the braking effect. The braking controller can be moved back and forth at will through its successive operative positions and thereby regulate the braking effect at the will of the operator.

"Parallel" regenerative braking.

Assume that instead of throwing the selector switch SS to make engagement with its upper set of contacts, it is thrown so as to make engagement with its lower set of contacts, and the main controller is moved to its eleventh operative position. When the braking controller is moved through its successive operative positions, the machines will now be connected in the relation shown specifically in Fig. 14, and shown generally in Fig. 8, which is a simplification of Fig. 14. "Parallel" braking relations will now be established, with the two groups of machines shown in Fig. 6, connected in multiple with each other. However, in this case the balancing resistors $R^{25}$ and $R^{27}$ are connected in series relation with the balancing resistors $R^{26}$ and $R^{28}$ respectively by the opening of the contactor 57, and the balancing resistors $R^{35}$ and $R^{37}$ are connected in series with the balancing resistors $R^{36}$ and $R^{38}$ respectively by the opening of the contactor 100. During parallel braking, a greater value of balancing resistance in series with each exciter armature is necessary for the reason that a higher potential is applied o the machines, and these balancing resistors serve as limiting resistance between the supply circuit and the ground. Moving the braking controller through its successive operative positions gradually controls the resistors $R^{20}$ to $R^{24}$ inclusive and the resistors $R^{30}$ to $R^{34}$ inclusive in the manner previously explained, the arrangement of each group of machines for parallel braking being the same as that for series braking, with the exception of the inclusion of an extra balancing resistor in the circuit with each exciter armature.

Rheostatic braking.

Before commencing regeneration it is desirable to have a small amount of rheostatic or dynamic braking, and in order to do this the main controller handle is placed on the first notch. This connects the motors to the line and a small amount of motoring current flows, because of the fact that all of the accelerating resistance is in the circuit.

This ensures that the fields of the machines are built up in the proper direction. If now the braking handle is moved from the full field position to any of its operative positions, the line circuit is opened and the portions of the machines which operate as self-excited exciters now operate to give a dynamic braking effect which is determined by the position of the braking handle. It is not always necessary to establish the dynamic braking connections before commencing regeneration, but sometimes it is desirable, particularly where starting from rest on a descending heavy grade. When starting on a descending heavy grade, it is desirable that the slack in the train be all bunched against the locomotive and kept bunched until the regeneration has built up practically to full value.

The braking handle and the main handle are interlocked in such a manner that if the equipment is operating with their rheostatic or regenerative braking, if the main controller handle is returned to the off position, the braking handle is always returned to the full field position and the braking connections are opened. A great simplification in the wiring and control apparatus is thereby made possible, for the reason that no complicated electrical interlocking is necessary in order to ensure that a subsequent operation of the main handle will not produce an opposite effect from what is desired. Thus, no complicated electrical interlocks are necessary to ensure that when the reverse handle is returned to the off position and the handle removed in order to operate the controller on the other end of the locomotive, that the circuits are all opened on the first mentioned end of the locomotive so that the first mentioned controller will not interfere with the proper operation from the other end of the locomotive. In the arrangement of the present invention, comparatively simple mechanical interlocking between the braking and the main handles takes the place of complicated electrical interlocking. A very important feature of the present invention is that when the main handle is advanced from the off position to any operative position, the normal motoring connections which the operator would expect or would need in the case of an emergency are always first established.

General features of interlocking.

The mechanical interlocking of the controller is so arranged that certain results can only be obtained by one method of operation of the handles. This ensures that in operating the controller the engineer must operate in one manner only to obtain certain results. By doing this he becomes accustomed to the correct manipulation, so that in emergencies when the engineer has no time to think out what he should do, he will perform the correct operations without thinking, as a result of the training which he has received during normal operation.

The braking handle is arranged also to change the field strength of the traction motors during motoring by movement into opposite positions from that occupied during braking. In this particular controller the fields are tapped in one step only, but for a particular installation it may be desirable to use field shunting or field tapping in a plurality of steps. It will be understood by those skilled in the art that the object of the field control is to vary the ampere turns of the motor fields and that such variation may be had in several ways. Also in case of emergency, the engineer only has to manipulate one handle in shutting off the controller. This does not apply during regeneration for the reason that the main handle cannot be returned from either the series or series parallel position to the off position unless the braking handle is first returned to the first position braking. A movement then of the main handle into the off position returns the braking handle from the first position to the full field position before the main handle is in the off position.

The cam controllers are biased to their respective positions at which the motors are all connected in series, and that means that in case at any time the operating electromagnets for the cam controllers are deenergized, the motors will be connected in series relation. The practical advantage of this arrangement is that in case the locomotive is towed by another locomotive, due to the fact that all of the motors are in the series connection there will be no danger of interchange of current between the motors and consequent sliding of wheels as is the case where a locomotive with motors connected in parallel is towed and the reverser happens to be thrown in the wrong direction. In such a case the motors build up on each other as series generators and a high current is obtained which causes the wheels to skid. On a large locomotive this wheel slipping usually results in flat spots on the driving wheels. By the arrangement of the switches also they automatically normally assume the series positions and in this way they are always returned for operation preparatory to when the controller is turned on the first notch. It is thus unnecessary to wait on the first notch until these switches have thrown before current can be obtained thereby introducing a time delay, which at times is a nuisance, although not a serious objection. The general idea is that with the controller shut off, the switches automatically by reason of their magnet connections assume the position which will give the motor combination that will be required when the controller is moved on to the first notch.

A new feature is introduced in the method of cutting out motors, in that cam contacts 72 and 116 are introduced on the grounded side of each group of traction motor fields. When the motors are cut out as they are in groups of six by operating the handle of the particular cam switch involved, then one of these contacts opens. The cam switch performs the ordinary functions of preventing power flowing from the trolley down to the high side of those motors which are cut out, and this cam on the grounded side isolates the low side of the fields from ground. Suppose one of the motors had a grounded brushholder and that was the reason for cutting out the group of motors. Suppose that due to this defect it was proposed to tow the locomotive and that no provision was made to ensure the reverser on the locomotive being thrown into the position corresponding to the direction in which the locomotive was to be towed. It will then be seen that were it not for this cam contact on the low side of the traction motor fields there would be a circuit from the grounded brushholder to ground, from ground up to the motor fields, through the motor fields and up to the other side of the armature. With the reverser thrown in the wrong direction, this would mean that the motor or motors included in this circuit would be connected as series generators with dead short circuit and a large amount of current would flow. This flow of current would probably do further damage to the already damaged traction motor.

*Controller interlocking.*

The interlocking arrangements of the controller and the protective features referred to generally previously will be taken up in the order previously given.

I. The reverse handle RH cannot be moved from the forward or reverse position unless the main handle is in the "off" position. Referring to Figs. 16, 23 and 27; when the main handle MH is in an operative position as shown in Fig. 27, the pawl 118 is held by spring 119 (Fig. 23) so that the roller 120 on the one end of the pawl 118 rests in either of the two deeper notches adjacent the middle notch on the star wheel 121 mounted on the shaft 122 depending upon whether the reverse handle RH is in the forward or reverse position. When the main handle MH is turned to an operative position, the pawl 118 is fixed in this position by cam 123 mounted on the shaft 124. The shaft 124 is operatively connected to the main handle by the pinion 125 which meshes with the gear 126. With the roller 120 of pawl 118 held in either of the two deeper notches of star wheel 121, it is impossible to throw the reverse handle. When the main handle is returned to the "off" position, cam shaft 124 is rotated so that the notch in cam 123 comes opposite the hook end of pawl 118 which allows the end of this pawl to move, and under these conditions the reverse handle may be thrown to any operative position.

II. The main handle cannot be moved from the "off" position unless the reverse handle is in the forward or reverse position. With the reverse handle in the forward or reverse position, the hook end of pawl 118 will not engage in the notch of cam 123 and the main handle is free to move. If the reverse handle is thrown to the "off" position, pawl 118 engages in the notch in cam 123 and by reason of the gearing connecting the cam shaft and the main handle, the main handle is held in the "off" position.

III. The braking handle must be in the full field position before the reverse handle can be moved from the "off" to either the forward or reverse positions. This is to ensure that when the main handle is moved from the "off" position to the first notch, motoring connections with full field will always be had. Referring to Figs. 19, 20 and 27; when the reverse handle RH is in either the forward or reverse position, the roller 127 on pawl 128 is held by spring 129 in either of the two deeper notches in star wheel 130 mounted on the shaft 122. The star wheel 130 is shown in the "off" position in Fig. 20 and in the forward position in Fig. 27, and the pawl 128 is shown of a slightly different construction in Fig. 27 in order to show an exploded view of the entire controller. If the braking handle is in any position except the full field position, pawl 128 is held in either of the two deeper notches of the star wheel 130 by cam 131, mounted on the shaft 132 on which the braking controller BrC is also mounted and connected to the braking handle by the pinion 133 and gear 134. As the roller on pawl 128 cannot rise out of the notches in star wheel 130, it is impossible to throw the reverse handle under these conditions.

IV. The braking handle cannot be moved from the full field position unless the reverse handle is in the forward or reverse position. Referring again to Figs. 19, 20 and 27; if the reverse handle is in the "off" position and the roller 127 on pawl 128 is in the middle notch corresponding to the "off" position of the reverse handle, as shown in Fig. 20, pawl 128 engages in the notch in cam 131 which is fastened to the braking cylinder shaft 132 and prevents movement of the braking handle from the full field position.

V. The braking handle cannot be moved from the full field position to the tapped field position unless the main handle is in the series, series parallel or parallel positions. This ensures that the engineer will not attempt to tap the fields of the motors until all of the accelerating resistance is cut out. Referring to Figs. 20 and 27; the star wheel 135 is fastened to the shaft 124 of the main cylinder MC of the controller and the three notches in the star wheel correspond to the series, series parallel and parallel positions respectively of the main cylinder. When the roller of pawl 136 is resting on the full surface of the star wheel 135, the pawl is in the path of lever 137 which is fastened to the shaft 138 operated by the braking handle and referring to Fig. 27 prevents movement of the braking handle in the right hand direction to the position at which the fields are tapped. When the roller on pawl 136 drops into any one of the three notches of star wheel 135, the braking handle may be moved a slight distance to the right from the full field position (Figs. 17 and 27) and the fields may be tapped. This eliminates what would otherwise be a useless waste of power because if an effort is made to tap the fields while a portion of the accelerating resistance is still in circuit, the resultant change in speed is not sufficient to justify the loss of power in the accelerating rheostats.

VI. Movement of the main handle in either direction from the series or series parallel position or movement of the main handle toward the "off" position from the parallel position with the braking handle in the motoring tapped field position causes the braking handle to be returned to the full field position. The reason for this is to ensure that no attempt will be made to use the tapped field position of the controller while any of the accelerating resistance is in circuit. Referring to Figs. 16, 17, 20 and 27; if the main handle is in the series, series parallel or parallel positions and the braking handle is in the tapped field position, the roller on pawl 136 is in one of the three notches on star wheel 135 and the dog 137 has been moved so that it is in contact with one of the rollers on pawl 136. When the main handle is moved in either direction under these conditions, the pawl 136 is forced out of the notches in star wheel 135 and this moves dog 137 in the left hand direction, Fig. 27, (right hand direction Fig. 20) which rotates the shaft 138 and thus moves the braking handle toward the left Fig. 27 from the tapped field to the full field position. This is the case whether the main handle is advanced or returned toward the "off" position. It will also be observed that the main handle may always be returned toward the "off" position.

VII. The main handle cannot be moved out beyond the series parallel position unless the braking handle is in the three motor group motoring, full field or the four motor group motoring, full field position. The reason that it is necessary to select by means of the braking handle before the main handle can be moved out of the series parallel position, is that in case the braking handle were left in a mid-position between its up and down positions and the main handle advanced beyond the series parallel position, if the operator then threw the braking handle to either its up or down position, the connections for either three-motor group motoring or four-motor group motoring full field would be established with a portion of the accelerating resistance cut out of circuit. That would probably cause an excessive rush of current from the line and produce an undesirable jolt in the operation of the train. Referring to Figs. 16, 19, 21, 22 and 27; cam 139 is keyed to the shaft 124 which rotates the main cylinder. Cam 140 is mounted on a sleeve 141 on the shaft 138 and is moved up and down by the opposite movements of the braking handle. The braking handle is pivotally mounted at 142 in the support 143 fastened to the shaft 138. Cam 140 is shown in its lower position in Figs. 19, 21, 25 and 27. When cam 140 is in either its upper or lower position, the dog on the right hand end (Figs. 19, 21) of the pawl 144 pivotally mounted on the rod 145 can move inward toward the shaft 138 by passing between the upper surface of the upper portion 140$^a$ of the cam 140 and the under surface of the cam 146 mounted on the shaft 138. If the cam 140 is midway between the two extreme positions, the dog on the right hand end (Figs. 19, 21 and 27) is locked between the under surface of the portion 140$^a$ and the upper surface of the portion 140$^b$ of the cam 140, and with it locked in this position, the projection of the cam 139 prevents the rotation of the shaft 124 beyond a certain position and thus prevents the main handle from being moved beyond the series parallel notch. If after the braking handle has been moved to select for either three or four motor positions, and the main handle is turned from the "off" position to an operative position, it is impossible to move the braking handle from the position chosen to select the other motor combination. Also, when the main handle is moved out beyond the series parallel position, then the braking handle cannot be moved out of either the up or down position. This prevents the operator attempting to change from three-motor group motoring to the four-motor group connection, or vice versa, with all or a portion of the resistance cut out. Referring again to Figs. 19, 21, 22 and 27; with the main handle beyond the series parallel position, cam 139 is moved by the shaft 124 and the roller on the left hand end of the pawl 144 (Figs. 19, 21, 22) is on the high portion of the cam 139. In this position, the dog on the right hand end of the pawl extends beyond cam 140 and between the upper surface of the upper portion 140ª and the under surface of the cam 146, so that it is impossible to move the braking handle from its lower to its upper position, and vice versa, with the dog in this position. This prevents throwing the selective handle from the three-motor position to the four-motor position or vice versa with the main handle beyond the series parallel running position.

VIII. It is necessary to press a button in the end of the braking controller handle in order to pass from the full field to the tapped field position. It is also necessary to press this button when moving the braking handle from the full field position to the first braking position. This is to prevent an accidental or unintentional movement of the braking handle from the full field position to either tapped field or the braking position, and requires that the operator do a definite thing intentionally before he can pass out of the full field position of the braking handle. Referring to Fig. 18; the button referred to is part 147. Pressing the button moves the pivotally mounted latch 148 against the bias of the spring 149. With this latch in its normal position it engages in notch 150 on the top of the braking dial ring for the braking handle. This dial ring is shown developed in Fig. 17. Pressing the button 147 permits the latch 148 to move free of the notch 150.

IX. The braking handle cannot be moved from the full field position (the position corresponding to the notch 150) to the first position high speed or parallel braking unless the main handle is in the series parallel position with all resistance in the circuit (11th position) or in the series position with all resistance in the circuit. This is to prevent the establishment of parallel regenerative braking connections unless a safe value of the accelerating resistance is in the motor circuit. Referring to Figs. 19, 21, 26 and 27; when the braking handle is in the upper or high speed position, with the sleeve 141 in the lower position, the cam 140 is in the same plane as pawl 151 mounted on rod 145ª. This pawl is equipped with a roller 152 on one end and a dog 153 on the other. When the braking handle is in the full field position (that corresponding to the notch 150, Fig. 17), the dog 153 engages in the notch shown in cam 140 and is held in this position by means of a spring 154. The dog is disengaged from this notch when the main handle is in the first or 11th position by means of the raised portions of the cam 155 as shown in Fig. 21. In either of these two positions the raised portion of the cam 155 forces the dog 153 out of engagement with the cam 140, allowing the braking handle to be moved to a direction to obtain braking.

X. The braking handle cannot be moved from the full field position (notch 150, Fig. 17) to the first position low speed or series braking position unless the main handle is in the series position with a portion of resistance cut out. This is to prevent the establishment of series braking connections unless a safe value of the accelerating resistance is in the motor circuits. Referring again to Figs. 16, 26 and 27; during low speed braking the braking handle is in the lower position, the sleeve 141 is in the upper position and cam 140 is in the same plane with the pawl 156 mounted on rod 145ª, and when the braking handle is in the full field position, the dog on pawl 156 is held in the notch on cam 140 by the spring 157. Cam 158 is designed so that when the main handle is in either the 1st, 2nd, 3rd or 4th notches, the pawl 156 is moved so that the dog disengages from the notch in cam 140. This allows the braking handle to be moved in the direction to obtain braking.

XI. The main handle cannot be moved beyond the full series position with the braking handle in any of its positions for establishing series braking. During "series" braking the braking handle will be in the lower position and the upper portion 140ª of cam 140 will be in its upper position in the same plane with pawl 160. When the braking handle is advanced, the upper portion 140ª of cam 140 allows the pawl 160 to drop into the recess in the cam which places the pawl in a position to engage with a stop 161 on the lower surface of cam 158. Cam 158 is attached to the main cylinder and the stop mentioned above engages with the pawl when the main controller handle reaches the full series position (see Fig. 16) and prevents moving the main cylinder beyond this position.

XII. The main handle cannot be moved beyond the full series parallel position with the braking handle in any one of its positions for establishing parallel braking. During high speed braking, the braking handle is in its upper position, and as shown in Fig. 27, the lower portion 140$^b$ of cam 140 is in the same plane with the pawl 162. When the braking handle is in any of the high speed braking positions, cam 140$^b$ allows the pawl 162 to drop into engagement with the projection 163 on cam 155 which is fastened to the main cylinder. This projection comes into contact with the pawl and stops the main cylinder on the series parallel notch.

XIII. The main handle cannot be moved back from the full series or the full series parallel position toward the "off" position unless the braking handle is in the first position braking, the full field position or the tapped field position. This is to ensure that when turning the main handle off from the full series or full series parallel position during regeneration, that regeneration is not carried on thru the accelerating resistance. Unless the field strength of the traction motors is reduced to the minimum excitation by movement of the braking handle to the first position, there would be a certainty of getting over voltage on the traction motors while moving the main controller toward the "off" position. This would either cause damage to the motors or trip the over voltage release mechanism, if such were provided, and open the circuits of the machines entirely before it was expected, which might produce some jolt to the train. This interlocking also has the advantage that because the field strength is reduced to the minimum amount, the current, which the line contactors must open when the main controller reaches the position at which they are required to open, is reduced to a small value. Referring to Figs. 20, 26 and 27; when the braking handle is advanced, lever 137 is rotated in a clockwise direction and rotating this lever in this direction releases pawl 136 and allows the spring 164 to pull the pawl against a stop 165 made as a part of cam 135. When the main handle is advanced into the full series position, the right hand end of pawl 136 (Fig. 27) comes into engagement with the stop 165 and prevents turning off the main handle by locking cam 135. The main handle is similarly locked in the series parallel position by another stop (not shown) on the lower surface of cam 135, angularly disposed from the stop 165 at the proper distance. When the braking handle is returned to the first position, dog 137 engages with a roller on pawl 136 and forces the pawl out of engagement with the respective stop on the lower surface of cam 135, thus permitting turning the main handle toward the "off" position.

XIV. It is necessary to press a button in the end of the main handle to go from the fourth notch to the fifth notch, to go from full series to series parallel, and to go from the full series parallel position to the parallel positions. The button referred to is designated by numeral 166, and by referring to Fig. 25 it will be seen that the rod connected to the button abuts against the one arm of the bell crank 167. The other arm of the bell crank engages the respective stops shown in Fig. 16 at the positions above referred to, and it is necessary to press the button 166 before the main handle can be advanced beyond these positions.

XV. The braking handle can only be moved from the first position series or parallel braking position to the full field position by releasing a special latch associated with the braking handle. This is to make it possible to return the braking handle directly to the full field position from any operative position without having to first return the main handle to the "off" position and then advance the main handle to its previous position. This will be used only in special cases, as, for example, in case the locomotive is on an easy grade where sometimes braking is bad and sometimes a motoring current is taken from the line. Referring to Figs. 15, 18 and 25; the special latch referred to is shown as part 168. By depressing this latch, it is disengaged from a notch in the braking sector ring. This ring is shown in Fig. 17 and the notch referred to is designated 169.

XVI. Movement of the main handle from any position to the "off" position moves the braking handle from the first position series braking or the first position parallel braking to the full field position. It will be remembered that the main handle cannot be returned to the "off" position from the series or parallel positions unless the braking handle is in first position. Referring to Fig. 25; with the braking handle in the first position, when turning off the main handle, cam 169 raises the latch 168 and disengages it from the sector ring. As the main handle is turned further toward the "off" position, the catch 170 engages with the spring pressed detent 171 carried by the support 143 for the braking handle and the braking handle is returned to the full field position.

The manner in which the movement of the braking handle functions as a selector switch is shown in Fig. 24. The selector switch SS (Fig. 3) is pivotally connected to the link 172, which is pivotally connected to one end of the lever 173, the other end of which is pivotally connected to the sleeve 141 on the shaft 138. When the braking handle is turned to its lower position (Fig. 25), the sleeve 141 is raised and the selector switch SS is lowered to the position to establish the connections for "series" or low speed braking, or four-motor-in-group motoring in the parallel connection. When the braking handle is thrown to its upper position, the selector switch establishes the connections for "parallel" or high speed braking or high speed three-motor-in-group motoring in the parallel connection.

What we claim as new and desire to secure by Letters Patent of the United States, is:—

1. In a system of control for a plurality of series wound dynamo electric machines adapted to either operate as motors to drive a common load or as braking generators to retard the load, comprising a series parallel main controller, a braking controller cooperating therewith, and connections whereby moving the series parallel controller to a definite position and the braking controller to a definite position establishes the machines in a plurality of substantially similar series connected groups with a portion of the machines in each group connected to operate as a self excited exciter for the field windings of the remainder of the machines in the group for electric braking.

2. In a system of control for a plurality of series wound dynamo electric machines adapted to either operate as motors to drive a common load or as braking generators to retard the load, comprising a series parallel main controller, a braking controller cooperating therewith, and connections whereby moving the series parallel controller to a definite position and the braking controller to a definite position establishes the machines in a plurality of substantially similar parallel connected groups with a portion of the machines in each group connected to operate as a self excited exciter for the field windings of the remainder of the machines in said group for electric braking.

3. Controlling means for a plurality of series wound dynamo electric machines comprising a series parallel controller, a braking controller cooperating therewith having means for connecting the machines to operate as motors or as generators and means for tapping the fields of the machines, a reverser for the said machines, and connections between the said controllers and reverser for preventing the reversal of the machines unless the said braking controller is in a position to establish the full field relation of the machines.

4. Controlling means for a plurality of series wound dynamo electric machines comprising a series parallel controller, a braking controller cooperating therewith having means for connecting the machines to operate as motors or as generators and to tap the fields of the machines during motoring operation, a reverser for the machines, and connections whereby the said braking controller is prevented from tapping the said fields unless the reverser is in either its definite forward or reverse position.

5. A controller for a plurality of dynamo electric machines comprising switch mechanism for establishing motoring or braking connections for the machines and for varying the field excitation of the machines, a main controller having a plurality of successive operative positions for successively establishing the machines in various relations, and interlocking mechanism for preventing the said switch mechanism from varying the field excitation of the machines unless the main controller is in the final position for a particular relation of the machines.

6. Controlling means for a plurality of electric motors having series fields comprising switch mechanism for varying the field strength of the motors, a main controller for varying the motor current and for establishing the motors in series, series-parallel and parallel arrangements, and interlocking mechanism whereby the said switch mechanism cannot be operated to vary the field strength of the motors unless the main controller is in either the full series, the full series-parallel or the full parallel position.

7. Means for controlling a plurality of series wound dynamo electric machines comprising a main controller having a plurality of successive operative positions for establishing the machines in various relations with each other and for regulating the machines, a second controller cooperating therewith for connecting the machines to operate as motors or as generators, the second controller having means for tapping the fields of the machines for motoring operation, and interlocking connections between the said controllers for preventing the fields of the machines from being tapped unless the main controller is in one of its full running positions for a particular relation of the machines.

8. Controlling means for an electric motor comprising a controller having a plurality of successive operative positions for controlling the motor speed, switch mechanism for varying the field excitation of the motor, and means whereby moving the said controller to vary the motor speed causes the said switch mechanism to increase the field excitation of the motor.

9. Controlling means for a plurality of electric motors comprising a controller having a plurality of successive operative positions for establishing the motors in various relations with each other and for varying the speed of the motors in each relation, switch mechanism for varying the field excitation of the motors, and means whereby moving the said controller in either direction to increase or decrease the speed of the motors causes the said switch mechanism to establish the full field relation of the motors.

10. Controlling means for a plurality of electric motors comprising a controller having a plurality of successive operative positions for establishing the motors in series and series-parallel relations with each other and for varying the speed of the motors in each relation, switch mechanism for tapping the fields of the motors, and means whereby moving the said controller to vary the speed of the motors operates the said switch mechanism to establish the full field relation of the motors.

11. Controlling means for a plurality of series wound dynamo electric machines comprising a main controller having a plurality of successive operative positions and means for establishing the machines in series and series-parallel relations with each other and for varying the speed of the machines in each relation, an auxiliary controller cooperating with the main controller and having means for causing the machines to operate as motors or as generators and for tapping the fields of the machines during motoring operation, interlocking connections between the said auxiliary and main controllers for preventing the movement of the auxiliary controller to tap the motor fields unless the main controller is in the full series or the full series-parallel position, and connections between the said controllers whereby moving the main controller in either direction from the series or the series-parallel position operates the said auxiliary controller to establish the full field relation of the motors.

12. Controlling means for a plurality of electric motors comprising a main controller having a plurality of successive operative positions and having means for establishing the motors in certain series parallel relations and for regulating the speed of the motors in each relation, an auxiliary controller cooperating with the main controller and having a plurality of operative positions and means for establishing the motors in a plurality of other relations with each other, and means whereby the said main controller is prevented from being advanced beyond one of said series-parallel relations unless the said auxiliary controller is in one of its operative positions.

13. Controlling means for a plurality of series wound electric motors comprising a main controller having a plurality of successive operative positions and having means for establishing the motors in one series-parallel relation and for regulating the speed of the motors in each of several other series-parallel relations, a selector switch cooperating with the main controller and having a plurality of operative positions and having means for establishing the motors in a plurality of higher speed series-parallel relations, and means whereby the said main controller is prevented from being advanced beyond the first series-parallel relation unless the said selector switch is in one of its operative positions.

14. Controlling means for a plurality of series wound electric motors comprising a main controller having a plurality of successive operative positions and having means for establishing the motors in one series-parallel relation and for regulating the speed of the motors in each of several other series-parallel relations, an auxiliary controller cooperating therewith and having a plurality of operative positions, the said auxiliary controller having means for establishing the motors in either of two higher speed series-parallel relations and for varying the field excitation of the motors in each of said series-parallel relations, and means whereby the said main controller is prevented from being advanced beyond the first series-parallel relation unless the said auxiliary controller is in one of its operative positions at which the full field relation of the motors is established.

15. Controlling means for a plurality of series wound motors comprising a main controller having a plurality of successive operative positions and having means for establishing the motors first in series relation and then in one series-parallel relation and for regulating the speed of the motors in the said first series parallel relation and in each of several other higher speed series parallel relations, an auxiliary controller cooperating with the main controller, the said auxiliary controller having switch mechanism movable by a movement of the controller along its axis to establish either of two higher speed series parallel arrangements and switch mechanism movable by a movement of the controller about its axis for each of said higher speed series parallel relations to tap the fields of the motors, and interlocking connections between the said controllers whereby the main controller is prevented from being advanced beyond the first series parallel relation of the motors unless the said auxiliary controller is in a position at which the full field relation of the motors is established.

16. Controlling means for a plurality of series wound dynamo electric machines adapted to operate as motors to drive a common load or be driven thereby and operate as braking generators, comprising a main controller having a plurality of successive operative positions and having means for connecting the machines in series relation and then in one series parallel relation for motoring operation and regulating the speed of the machines in the said first series parallel relation and in each of two other higher speed series parallel relations, an auxiliary controller cooperating therewith having means for connecting the machines to operate as motors or as generators, the said auxiliary controller having switch mechanism movable by a movement of the controller along its axis of rotation to one position to establish either a low speed braking relation of the machines or one high speed series parallel motoring relation and movable along its axis to another position to establish either a high speed braking relation of the machines or another high speed series parallel motoring relation and switch mechanism movable by a movement of the controller about its axis to one position to establish a motoring tapped field relation of the machines, and interlocking connections between the said controllers whereby the main controller is prevented from being advanced beyond the first series parallel motoring relation unless the said auxiliary controller is in a position at which the full field relation of the motors is established.

17. A controller having a plurality of operative positions for controlling a dynamo electric machine, the said controller having means for connecting the machine to operate as a motor to drive a load and for connecting the machine to operate as a braking generator driven by the load, switch mechanism controlled by the said controller for varying the field excitation of the machine, a manually operated handle for said controller, and means associated with the said handle for preventing the operation of the controller to a field varying position until the said associated means is operated.

18. A controller having a plurality of operative positions for controlling a dynamo electric machine, the said controller having means for connecting the machine to operate as a motor to drive a load and for connecting the machine to operate as a braking generator driven by the load, switch mechanism operated by the said controller for varying the field excitation of the machine, a manually operated handle for said controller, and a manually operated latch associated with the said handle for preventing the operation of the controller to a field varying position until the said latch is released.

19. A controller having a plurality of operative positions for controlling a dynamo electric machine, the said controller having means for connecting the machine to operate as a motor to drive a load and for connecting the machine to operate as a braking generator driven by the load, switch mechanism operated in one position of the said controller for varying the field excitation of the machine, a manually operated handle for the controller, a latch carried by the said handle for preventing the operation of the controller to a field varying position until the said latch is released, and a button in the end of said handle connected with the said latch for operating the same.

20. A controller having a plurality of operative positions for controlling a plurality of motors, the said controller having means for connecting the motors in either of two full field series parallel relations and in either of said series parallel relations with reduced field excitation, a handle for the said controller, and means cooperating with the said handle for preventing the establishment of either of said reduced field series parallel relations until the said cooperating means is operated.

21. A controller having a plurality of operative positions for controlling a plurality of motors, the said controller having means for connecting the motors in either of two full field series parallel relations and in either of said series parallel relations with reduced field excitation, a manually operated handle for said controller, a latch carried by the said handle for preventing the establishment of either of said reduced field series parallel relations until the said latch is released, and a button in the end of said handle connected to the said latch for operating the same.

22. A controller having a plurality of operative positions for controlling a dynamo electric machine, the said controller having means for connecting the machine to operate either as a motor to drive a load or as a braking generator driven by the load, switch mechanism operated by the said controller for varying the field excitation of the machine, a manually operated handle for said controller, and means associated with the said handle for preventing the operation of the controller to establish the braking connections of the machine until the said associated means is operated.

23. A controller having a plurality of operative positions for controlling a plurality of dynamo electric machines, the said controller having means for connecting the machines to either operate as motors to drive a load or as braking generators driven by the load, switch mechanism operated in one position of the said controller for varying the field excitation of the said machine, a manually operated handle for the controller, a latch carried by the said handle for preventing the operation of the controller to establish the braking connections of the machines until the said latch is released, and a button in the end of said handle connected with the said latch for operating the same.

24. Controlling means for a plurality of series dynamo electric machines adapted to operate as motors to drive a common load or be driven thereby and operate as braking generators, comprising a series parallel main controller, a braking controller cooperating therewith to connect the machines as braking generators in various relations with each other, a portion of the machines in each of said relations operating self excited to supply the excitation for the remainder of the machines, and means whereby said braking controller is operable to establish the said various braking relations only when the series parallel controller occupies certain predetermined positions.

25. Controlling means for a plurality of series dynamo electric machines adapted to operate as motors to drive a common load or be driven thereby and operate as braking generators, comprising a series parallel main controller, a braking controller cooperating therewith having means for connecting the machines as braking generators in a high speed braking relation or for connecting machines as braking generators in a low speed braking relation, a portion of the machines in each of said relations operating self excited to supply the excitation for the remainder of the machines, and means whereby the said braking controller is operable to establish the said braking relations only when the series parallel controller occupies certain predetermined positions.

26. Controlling means for a plurality of series dynamo electric machines adapted to operate as motors to drive a common load or be driven thereby and operate as braking generators, comprising circuits for said machines, a series parallel main controller, resistors in the machine circuits controlled thereby, a braking controller cooperating with the main controller to connect the machines as braking generators either in a high speed braking relation or in a low speed braking relation, means whereby a portion of the machines in each of said relations operates as a self exciter supplying the excitation for the remainder of the machines, and means whereby the said braking controller is operable to establish the high speed braking relation only when the series parallel controller is in the series parallel position with all the said resistors in circuit or the series position with all the said resistors in circuit.

27. Controlling means for a plurality of series dynamo electric machines adapted to operate as motors to drive a common load or be driven thereby and operate as braking generators, comprising a series parallel main as a motor to drive a load and for connecting therewith, a handle connected to the braking controller for operating the same, the said handle movable in one plane to select a plurality of braking relations and movable in another plane to establish the braking relation selected, and means whereby the said handle can operate the braking controller to establish the particular braking relation selected only when the series parallel controller is in a predetermined position.

28. Controlling means for a plurality of series dynamo electric machines adapted to operate as motors to drive a common load or be driven thereby and operate as braking generators, comprising circuits for said machines, a series parallel main controller, resistors in the machine circuits controlled thereby, a braking controller cooperating with the main controller, a handle connected to the braking controller, for rotating the same, selector switch mechanism operated by an up and down movement of the said handle to establish the machines in either a high speed braking relation or a low speed braking relation by a subsequent rotation of the braking controller, and interlocking connections between the said controllers whereby the said handle is operable to establish the high speed braking relation only when the series parallel controller is in the series parallel position with the said resistors in circuit or the series position with the said resistors in circuit.

29. Controlling means for a plurality of series dynamo electric machines adapted to operate as motors to drive a common load or be driven thereby and operate as braking generators, comprising circuits for said machines, a series parallel main controller, resistors in the machine circuit controlled thereby, a braking controller cooperating with the main controller to establish the motors in a plurality of substantially similar groups with a portion of the machines in each group operating self-excited supplying the excitation for the remainder of the machines in the groups, switch mechanism cooperating with the said braking controller to establish the said groups of machines in parallel relation, and connections between the said controllers whereby the said parallel relations of the groups of machines can only be established when the series parallel controller is in the series parallel position with the said resistors in circuit or the series position with the said resistors in circuit.

30. Controlling means for a plurality of series dynamo electric machines adapted to operate as motors to drive a common load or be driven thereby and operate as braking generators, comprising circuits for said machines, a series parallel main controller, a plurality of resistors in the machine circuits, a braking controller cooperating with the main controller to connect the machines as braking generators in a plurality of substantially similar series connected groups, means whereby a portion of machines in each group operates self-excited to supply the excitation for the remainder of the machines in the group, and means whereby the said braking controller is inoperable to establish the said braking relation of the machines unless the said main controller is in the series position with a portion of said resistors excluded from and a portion included in the said machine circuits.

31. Controlling means for a plurality of series dynamo electric machines adapted to operate as motors to drive a common load or be driven thereby and operate as braking generators, comprising a series parallel main controller, a braking controller cooperating therewith to connect the machines as braking generators in a plurality of substantially similar series connected groups, means whereby a portion of the machines in each group operates self-excited to supply the excitation of the remainder of the machines in the group, and means whereby the said braking controller is inoperable to establish the said braking relation of the machines unless the said main controller is in a predetermined position.

32. Controlling means for a plurality of series dynamo electric machines adapted to operate as motors to drive a common load or be driven thereby and operate as braking generators, comprising a series parallel main controller, a braking controller cooperating therewith to connect the machines as braking generators in a plurality of substantially similar series connected groups, means whereby a portion of the machines in each group operates self-excited to supply the excitation of the remainder of the machines in the group, and means whereby the said braking controller is inoperable to establish the said braking relation of the machines unless the said main controller is in the series position.

33. Controlling means for a plurality of series dynamo electric machines adapted to operate as motors to drive a common load or be driven thereby and operate as braking generators, comprising circuits for said machines, a series parallel main controller, a plurality of resistors in the machine circuits, a braking controller cooperating with the main controller to connect the machines as braking generators in a plurality of substantially similar series connected groups, means whereby a portion of machines in each group operates self-excited to supply the excitation for the remainder of the machines in the group, and means whereby the said braking controller is inoperable to establish the said braking relation of the machines unless the said main controller is in the series position with the said resistors included in the machine circuits.

34. Controlling means for a plurality of series dynamo electric machines adapted to either operate as motors to drive a common load or as braking generators to retard the load, comprising a series parallel main controller, a braking controller cooperating therewith, switch mechanism controlled by the said controllers, a handle for the braking controller movable in two planes, and connections whereby the said switch mechanism is operated to establish the machines in one relation for motoring or a different relation for braking by a movement of the said handle to a definite position in one of said planes.

35. Controlling means for a plurality of series dynamo electric machines adapted to either operate as motors to drive a common load or as braking generators to retard the load, comprising a series parallel main controller, a braking controller cooperating therewith, switch mechanism controlled by the said controllers, and a handle connected to the said braking controller movable in one direction to a definite position to cause the said switch mechanism to select a particular relation of the machines for motoring or a particular relation of the machines for braking, and movable in another direction to cause the said switch mechanism to select a higher speed motoring or a higher speed braking relation of the machines.

36. Controlling means for a plurality of series dynamo electric machines adapted to either operate as motors to drive a common load or as braking generators to retard the load, comprising a series parallel main controller, a braking controller cooperating therewith, switch mechanism controlled by the said controllers, a handle for the braking controller movable in two planes, and connections whereby the said switch mechanism is caused to establish the machines in one relation for motoring or a different relation for braking by a movement of the said handle to a definite position in one of said planes, and the said switch mechanism is caused to establish the machines in a higher speed motoring relation or a higher speed braking relation by a movement of the said handle to a definite position in its other plane of movement.

37. Controllng means for a plurality of series dynamo electric machines adapted to either operate as motors to drive a common load or as braking generators to retard the load, comprising a series parallel main controller, a braking controller cooperating therewith, switch mechanism controlled by the said controllers, and a handle for the braking controller movable in one direction to cause the said switch mechanism to select one of a plurality of particular braking relations of the machines and movable in another direction to regulate the braking effect of the relation thus selected.

38. Controlling means for a plurality of series dynamo electric machines adapted to either operate as motors to drive a common load or as braking generators to retard the load, comprising a series parallel main controller, a braking controller cooperating therewith, selector switch mechanism cooperating with the said controllers to establish the said machines in a plurality of different relations for motoring and for braking, and a handle connected to the said braking controller and to the said switch mechanism, the said handle being movable in either of two planes, and connections whereby a movement of the said handle in one of said planes to a definite position selects one relation of the machines for motoring or a different relation for braking, movement of the said handle to another definite position in the said plane operates the said selective switch mechanism to establish the machines in a higher speed motoring relation or a higher speed braking relation, and movement of the said handle in its other plane of movement operates the said braking controller to regulate the braking effect of the braking relation selected by the movement of the said handle in its first named plane of movement.

In witness whereof, we have hereunto set our hands this 14th day of October 1921.

WILLIAM S. H. HAMILTON.
RUDOLPH D. KRAPE.